United States Patent
Kim et al.

(10) Patent No.: US 10,740,993 B2
(45) Date of Patent: Aug. 11, 2020

(54) SYSTEM AND METHOD FOR PROVIDING HANDS FREE OPERATION OF AT LEAST ONE VEHICLE DOOR

(71) Applicant: Honda Motor Co., Ltd., Tokyo (JP)

(72) Inventors: Wesley W. Kim, Dublin, OH (US); Brian K. Lickfelt, Powell, OH (US); Douglas R. Reed, Marysville, OH (US); Emanuel Ulises Perez Zenteno, Dublin, OH (US); Tyler J. Rupp, Radnor, OH (US); Kentaro Yoshimura, Dublin, OH (US); Chyuan Y. Muh, Powell, OH (US); Spencer A. Kennedy, Columbus, OH (US); Tomonori Watanabe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/438,404

(22) Filed: Jun. 11, 2019

(65) Prior Publication Data

US 2019/0295346 A1    Sep. 26, 2019

Related U.S. Application Data

(63) Continuation of application No. 15/730,792, filed on Oct. 12, 2017, now Pat. No. 10,380,817.
(Continued)

(51) Int. Cl.
*G07C 9/00* (2020.01)
*B60R 25/24* (2013.01)
*E05B 81/78* (2014.01)

(52) U.S. Cl.
CPC ........ *G07C 9/00309* (2013.01); *B60R 25/245* (2013.01); *E05B 81/78* (2013.01);
(Continued)

(58) Field of Classification Search
None
See application file for complete search history.

(56) References Cited

U.S. PATENT DOCUMENTS

| 4,763,121 A | 8/1988 | Tomoda et al. |
| 5,929,769 A * | 7/1999 | Garnault ............. B60R 25/2009 340/12.51 |

(Continued)

FOREIGN PATENT DOCUMENTS

EP    1143089    10/2001

OTHER PUBLICATIONS

Automatic trunk release with the approach of the key fob.
(Continued)

*Primary Examiner* — Steven Lim
*Assistant Examiner* — Muhammad Adnan
(74) *Attorney, Agent, or Firm* — Rankin, Hill & Clark LLP

(57) ABSTRACT

A system and method for providing hands free operation of at least one vehicle door that include receiving at least one polling response signal that is sent by a portable device and analyzing the at least one polling response signal to determine a signal strength of the at least one polling response signal. The system and method additionally include determining if the portable device is located within at least one local area polling zone of the vehicle based on a comparison of the signal strength of the at least one polling response signal to at least one local area threshold value that is specifically associated with at least one transceiver of the vehicle that receives the at least one polling response signal with a highest signal strength and determining if the portable device is stationary for a predetermined period of time within the at least one local area polling zone of the vehicle.

16 Claims, 10 Drawing Sheets

Related U.S. Application Data

(60) Provisional application No. 62/485,360, filed on Apr. 13, 2017, provisional application No. 62/426,954, filed on Nov. 28, 2016.

(52) U.S. Cl.
CPC .............. *G07C 2009/00769* (2013.01); *G07C 2209/63* (2013.01)

(56) References Cited

U.S. PATENT DOCUMENTS

| | | | |
|---|---|---|---|
| 5,973,611 A | 10/1999 | Kulha et al. | |
| 6,181,254 B1 | 1/2001 | Vogele | |
| 6,236,333 B1 | 5/2001 | King | |
| 6,359,348 B1 | 3/2002 | King | |
| 6,449,482 B1* | 9/2002 | Johansson | H04W 16/12 455/443 |
| 6,498,970 B2 | 12/2002 | Colmenarez et al. | |
| 6,552,649 B1 | 4/2003 | Okada et al. | |
| 6,572,250 B1 | 6/2003 | Assinder et al. | |
| 6,583,715 B1 | 6/2003 | Benzie et al. | |
| 6,677,851 B1 | 1/2004 | Losey | |
| 6,700,475 B1 | 3/2004 | Geber et al. | |
| 6,814,476 B2 | 11/2004 | Assinder et al. | |
| 6,853,296 B2 | 2/2005 | Chandebois | |
| 6,906,612 B2 | 6/2005 | Ghabra et al. | |
| 6,907,323 B2 | 6/2005 | Avenel | |
| 6,981,789 B2 | 1/2006 | Assinder et al. | |
| 6,998,967 B2 | 2/2006 | Brillon et al. | |
| 7,058,411 B2* | 6/2006 | Chen | G01S 5/12 180/169 |
| 7,071,817 B2 | 7/2006 | Haselsteiner et al. | |
| 7,151,350 B2* | 12/2006 | Haag | G01S 13/04 318/280 |
| 7,175,227 B2* | 2/2007 | Menard | E05F 15/43 296/146.1 |
| 7,190,253 B2 | 3/2007 | Shimomura | |
| 7,224,980 B2* | 5/2007 | Hara | B60R 25/24 340/10.1 |
| 7,245,200 B2 | 7/2007 | Inoguchi | |
| 7,280,035 B2 | 10/2007 | McLain et al. | |
| 7,439,632 B2 | 10/2008 | Ogino et al. | |
| 7,683,764 B2 | 3/2010 | Kurpinski et al. | |
| 7,688,179 B2 | 3/2010 | Kurpinski et al. | |
| 7,705,710 B2* | 4/2010 | Hermann | B60R 25/24 340/426.11 |
| 7,915,998 B2 | 3/2011 | Matsubara et al. | |
| 8,022,808 B2 | 9/2011 | Kurpinski et al. | |
| 8,077,011 B2 | 12/2011 | McBride et al. | |
| 8,091,280 B2 | 1/2012 | Hanzel et al. | |
| 8,093,987 B2 | 1/2012 | Kurpinski et al. | |
| 8,126,450 B2* | 2/2012 | Howarter | B60R 25/2009 455/420 |
| 8,203,424 B2 | 6/2012 | Ghabra et al. | |
| 8,228,166 B2 | 7/2012 | Eberhard | |
| 8,237,544 B2 | 8/2012 | Nakashima | |
| 8,284,020 B2* | 10/2012 | Ghabra | B60R 25/245 340/5.61 |
| 8,284,022 B2 | 10/2012 | Heller et al. | |
| 8,427,276 B2 | 4/2013 | McBride et al. | |
| 8,427,287 B2 | 4/2013 | Heininger | |
| 8,442,728 B2 | 5/2013 | Wagenhuber et al. | |
| 8,476,832 B2 | 7/2013 | Prodin et al. | |
| 8,493,236 B2 | 7/2013 | Boehme et al. | |
| 8,589,033 B2 | 11/2013 | Rafii et al. | |
| 8,606,430 B2 | 12/2013 | Seder et al. | |
| 8,638,205 B2 | 1/2014 | Boehme et al. | |
| 8,717,429 B2 | 5/2014 | Giraud et al. | |
| 8,725,315 B2 | 5/2014 | Talty et al. | |
| 8,788,152 B2 | 7/2014 | Reimann et al. | |
| 8,868,299 B2 | 10/2014 | Kroemke et al. | |
| 8,896,417 B2 | 11/2014 | Song et al. | |
| 8,935,052 B2 | 1/2015 | Hermann | |
| 9,031,498 B1* | 5/2015 | Bertz | H04W 84/005 340/539.1 |
| 9,057,210 B2 | 6/2015 | Dumas et al. | |
| 9,068,390 B2 | 6/2015 | Ihlenburg et al. | |
| 9,129,454 B2 | 9/2015 | Ghabra | |
| 9,154,920 B2* | 10/2015 | O'Brien | G07C 9/00309 |
| 9,193,331 B2 | 11/2015 | Endo | |
| 9,205,806 B2 | 12/2015 | Günter | |
| 9,214,083 B2* | 12/2015 | Lim | G08C 17/02 |
| 9,241,235 B2 | 1/2016 | Santavicca | |
| 9,243,439 B2 | 1/2016 | Adams et al. | |
| 9,243,441 B2 | 1/2016 | Gupta et al. | |
| 9,336,637 B2 | 5/2016 | Neil et al. | |
| 9,344,083 B2 | 5/2016 | Elie et al. | |
| 9,388,623 B2 | 7/2016 | Ette et al. | |
| 9,394,737 B2 | 7/2016 | Gehin et al. | |
| 9,437,064 B1* | 9/2016 | Ghabra | G07C 9/00658 |
| 9,463,776 B2 | 10/2016 | Gunreben | |
| 9,508,204 B2 | 11/2016 | Oz et al. | |
| 9,573,565 B2 | 2/2017 | Schindler et al. | |
| 9,604,568 B1 | 3/2017 | Salter et al. | |
| 9,704,392 B2* | 7/2017 | Wang | G08G 1/012 |
| 9,725,942 B2* | 8/2017 | Gunreben | E05F 15/77 |
| 9,764,699 B2* | 9/2017 | Siswick | H04L 67/125 |
| 9,767,629 B1* | 9/2017 | Gulati | G07C 9/00182 |
| 9,852,560 B2* | 12/2017 | Bauman | G07C 9/00309 |
| 9,907,007 B1* | 2/2018 | Xue | H04W 36/30 |
| 10,158,719 B2* | 12/2018 | Khan | G07C 9/00309 |
| 10,212,557 B2* | 2/2019 | Siswick | H04W 4/023 |
| 10,429,430 B2* | 10/2019 | Wuerstlein | G01B 7/023 |
| 2001/0054952 A1 | 12/2001 | Desai et al. | |
| 2003/0222758 A1 | 12/2003 | Willats et al. | |
| 2004/0040771 A1* | 3/2004 | Ploucha | E05F 15/43 180/271 |
| 2005/0017842 A1* | 1/2005 | Dematteo | G07C 9/00309 340/5.72 |
| 2005/0168322 A1* | 8/2005 | Appenrodt | B60R 25/246 340/5.72 |
| 2005/0258936 A1* | 11/2005 | Ghabra | B60R 25/245 340/5.72 |
| 2006/0085847 A1* | 4/2006 | Ikeuchi | G06F 21/35 726/6 |
| 2006/0092002 A1* | 5/2006 | Finkelstein | B60R 25/24 340/426.19 |
| 2006/0103512 A1* | 5/2006 | Fukuda | B60Q 9/006 340/435 |
| 2007/0109093 A1 | 5/2007 | Matsubara et al. | |
| 2007/0132553 A1* | 6/2007 | Nakashima | E05B 77/48 340/5.72 |
| 2007/0162191 A1* | 7/2007 | Matsubara | G07C 9/00309 701/1 |
| 2007/0200669 A1* | 8/2007 | McBride | B60R 25/245 340/5.72 |
| 2007/0200672 A1* | 8/2007 | McBride | B60R 25/245 340/5.72 |
| 2007/0205862 A1 | 9/2007 | Brillon | |
| 2007/0216517 A1 | 9/2007 | Kurpinski et al. | |
| 2007/0268110 A1 | 11/2007 | Little | |
| 2008/0036571 A1 | 2/2008 | Kusunoki et al. | |
| 2008/0068145 A1 | 3/2008 | Weghaus et al. | |
| 2008/0129446 A1 | 6/2008 | Vader | |
| 2009/0006032 A1* | 1/2009 | Wilcox | G01S 13/825 702/176 |
| 2009/0024394 A1* | 1/2009 | Nakashima | G08G 1/005 704/275 |
| 2010/0076622 A1* | 3/2010 | Dickerhoof | B60R 25/24 701/2 |
| 2010/0289670 A1* | 11/2010 | Boehme | G01S 15/931 340/932.2 |
| 2010/0304690 A1 | 12/2010 | Proefke et al. | |
| 2010/0308961 A1* | 12/2010 | Ghabra | G07C 9/27 340/5.61 |
| 2011/0210821 A1 | 9/2011 | Gehin | |
| 2011/0248820 A1 | 10/2011 | Gehin | |
| 2011/0276234 A1* | 11/2011 | Van Gastel | E05B 81/78 701/49 |

(56) References Cited

U.S. PATENT DOCUMENTS

| | | | |
|---|---|---|---|
| 2012/0092129 A1* | 4/2012 | Lickfelt | B60R 25/24 |
| | | | 340/5.72 |
| 2012/0154114 A1* | 6/2012 | Kawamura | B60R 25/2072 |
| | | | 340/5.63 |
| 2012/0244877 A1* | 9/2012 | Margalef | G01S 5/0252 |
| | | | 455/456.1 |
| 2013/0234828 A1 | 9/2013 | Holzberg et al. | |
| 2013/0342379 A1 | 12/2013 | Bauman et al. | |
| 2014/0039766 A1 | 2/2014 | Miyake et al. | |
| 2014/0077930 A1 | 3/2014 | Coudre et al. | |
| 2014/0207344 A1* | 7/2014 | Ihlenburg | E05F 15/73 |
| | | | 701/49 |
| 2014/0253287 A1 | 9/2014 | Bauman et al. | |
| 2014/0285319 A1* | 9/2014 | Khan | G07C 9/00309 |
| | | | 340/5.61 |
| 2014/0292483 A1 | 10/2014 | Kim | |
| 2014/0313011 A1* | 10/2014 | Mimura | G07C 9/00309 |
| | | | 340/5.64 |
| 2015/0019046 A1 | 1/2015 | Jang et al. | |
| 2015/0022317 A1 | 1/2015 | Lange et al. | |
| 2015/0054647 A1* | 2/2015 | Edwards | G08B 21/22 |
| | | | 340/568.1 |
| 2015/0116085 A1* | 4/2015 | Juzswik | B60R 25/24 |
| | | | 340/5.72 |
| 2015/0120151 A1* | 4/2015 | Akay | G07C 9/28 |
| | | | 701/49 |
| 2015/0127193 A1 | 5/2015 | Tofilescu et al. | |
| 2015/0258962 A1* | 9/2015 | Khanu | B60R 25/2054 |
| | | | 701/49 |
| 2015/0284984 A1* | 10/2015 | Kanter | E05F 15/76 |
| | | | 49/31 |
| 2015/0291126 A1* | 10/2015 | Nicholls | E05F 15/73 |
| | | | 701/49 |
| 2015/0291127 A1* | 10/2015 | Ghabra | G07C 9/00309 |
| | | | 701/2 |
| 2015/0348344 A1 | 12/2015 | Rettig et al. | |
| 2016/0019734 A1* | 1/2016 | Bauman | G07C 9/20 |
| | | | 340/5.61 |
| 2016/0024825 A1 | 1/2016 | Warschat et al. | |
| 2016/0042580 A1* | 2/2016 | Funayama | E05F 15/76 |
| | | | 701/2 |
| 2016/0059827 A1* | 3/2016 | Uddin | B60R 25/245 |
| | | | 701/2 |
| 2016/0083995 A1 | 3/2016 | Dezorzi et al. | |
| 2016/0176382 A1* | 6/2016 | Siswick | B60R 25/245 |
| | | | 701/2 |
| 2016/0214573 A1* | 7/2016 | Lagabe | B60R 25/245 |
| 2016/0225260 A1 | 8/2016 | Lin | |
| 2016/0251891 A1 | 9/2016 | Herthan et al. | |
| 2016/0267734 A1* | 9/2016 | Hamada | G07C 9/00309 |
| 2016/0281410 A1 | 9/2016 | Schanz et al. | |
| 2016/0297400 A1* | 10/2016 | Krishnan | B60R 25/241 |
| 2016/0318477 A1* | 11/2016 | Morimoto | B60R 25/40 |
| 2017/0291579 A1* | 10/2017 | Miyazawa | H04B 17/318 |
| 2017/0342750 A1* | 11/2017 | Hiramine | G07C 9/00309 |
| 2018/0103414 A1* | 4/2018 | Golsch | B60W 10/08 |
| 2018/0339676 A1* | 11/2018 | Lazarini | G07C 9/00309 |

OTHER PUBLICATIONS

Office Action of U.S. Appl. No. 16/438,422 dated Dec. 23, 2019, 47 pages.
Notice of Allowance of U.S. Appl. No. 16/438,415 dated Oct. 23, 2019, 33 pages.
Office Action of U.S. Appl. No. 16/438,413 dated Jan. 16, 2020, 42 pages.

* cited by examiner

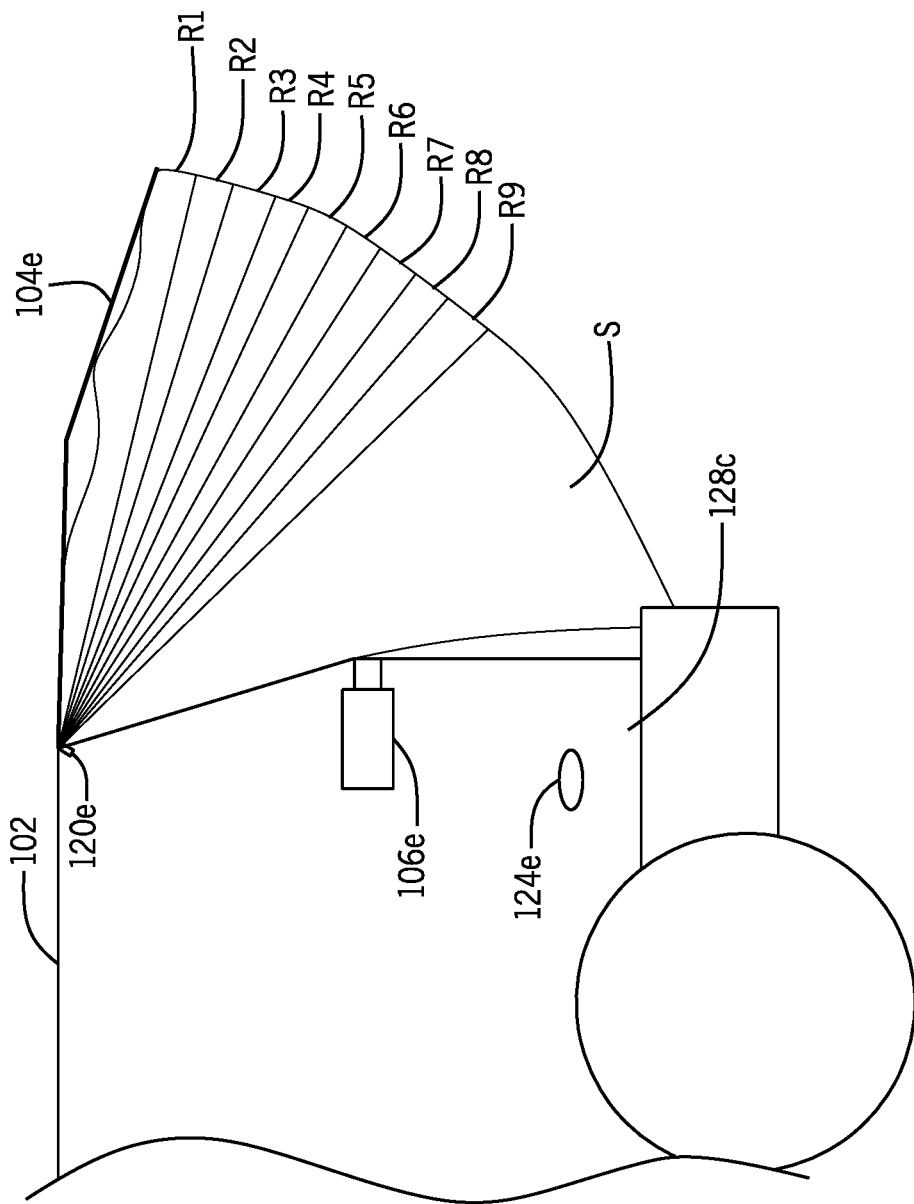

SYSTEM AND METHOD FOR PROVIDING HANDS FREE OPERATION OF AT LEAST ONE VEHICLE DOOR

RELATED APPLICATIONS

This application is a continuation of, and claims priority to U.S. application Ser. No. 15/730,792 filed on Oct. 12, 2017, the entire application of which is incorporated herein by reference; U.S. application Ser. No. 15/730,792 claims priority to U.S. Provisional Application Ser. No. 62/485,360 filed on Apr. 13, 2017, which is also incorporated herein by reference; U.S. application Ser. No. 15/730,792 also claims priority to U.S. Provisional Application Ser. No. 62/426,954 filed on Nov. 28, 2016, which is also incorporated herein by reference.

BACKGROUND

Many vehicles today include systems that may allow powered opening and closing of vehicle doors that include a tailgate door. Many of these systems require an individual to perform some type of action to instruct the systems that the vehicle door should be opened or closed. For example, some systems require individuals to input specific buttons on a key fob in a specific manner in order to instruct the systems to actuate powered opening or closing of the vehicle door. Additionally some systems require individuals to perform some type of gesture(s) (e.g., kicking foot under a vehicle tailgate) in order to instruct the systems to actuate powered opening or closing of the vehicle door. Such actions may often be inconvenient to perform for the individual, especially in situations when the individual is carrying objects and/or are physically unable to perform such actions.

BRIEF DESCRIPTION

According to one aspect, a computer-implemented method for providing hands free operation of at least one vehicle door is provided that includes receiving at least one polling response signal that is sent by a portable device in response to the portable device receiving at least one polling signal sent from a vehicle. The computer-implemented method also includes analyzing the at least one polling response signal received by the vehicle to determine a signal strength of the at least one polling response signal. The computer-implemented method additionally includes determining if the portable device is located within at least one local area polling zone of the vehicle based on a comparison of the signal strength of the at least one polling response signal to at least one local area threshold value that is specifically associated with at least one transceiver of the vehicle that receives the at least one polling response signal with a highest signal strength. The computer-implemented method further includes determining if the portable device is stationary for a predetermined period of time within the at least one local area polling zone of the vehicle, wherein an amount of power is supplied to a motor associated with the at least one vehicle door to open or close the at least one vehicle door if it is determined that the portable device is stationary for the predetermined period of time within the at least one local area polling zone of the vehicle.

According to another aspect, a system for providing hands free operation of at least one vehicle door is provided. The system includes a memory storing instructions that, when executed by a processor, cause the processor to receive at least one polling response signal that is sent by a portable device in response to the portable device receiving at least one polling signal sent from a vehicle. The instructions also cause the processor to analyze the at least one polling response signal received by the vehicle to determine a signal strength of the at least one polling response signal. The instructions additionally cause the processor to determine if the portable device is located within at least one local area polling zone of the vehicle based on a comparison of the signal strength of the at least one polling response signal to at least one local area threshold value that is specifically associated with at least one transceiver of the vehicle that receives the at least one polling response signal with a highest signal strength. The instructions further cause the processor to determine if the portable device is stationary for a predetermined period of time within the at least one local area polling zone of the vehicle, wherein an amount of power is supplied to a motor associated with the at least one vehicle door to open or close the at least one vehicle door if it is determined that the portable device is stationary for the predetermined period of time within the at least one local area polling zone of the vehicle.

According to still another aspect, a non-transitory computer readable storage medium stores instructions that, when executed by a computer, which includes at least a processor, causes the computer to perform a method that includes receiving at least one polling response signal that is sent by a portable device in response to the portable device receiving at least one polling signal sent from a vehicle. The method also includes analyzing the at least one polling response signal received by the vehicle to determine a signal strength of the at least one polling response signal. The method additionally includes determining if the portable device is located within at least one local area polling zone of the vehicle based on a comparison of the signal strength of the at least one polling response signal to at least one local area threshold value that is specifically associated with at least one transceiver of the vehicle that receives the at least one polling response signal with a highest signal strength. The method further includes determining if the portable device is stationary for a predetermined period of time within the at least one local area polling zone of the vehicle, wherein an amount of power is supplied to a motor associated with the at least one vehicle door to open or close at least one vehicle door if it is determined that the portable device is stationary for the predetermined period of time within the at least one local area polling zone of the vehicle.

BRIEF DESCRIPTION OF THE DRAWINGS

FIG. 7B is an illustration of a motion sensor utilizing a predetermined detection range of the tailgate door according to an exemplary embodiment of the present disclosure.

DETAILED DESCRIPTION

Figure 1:
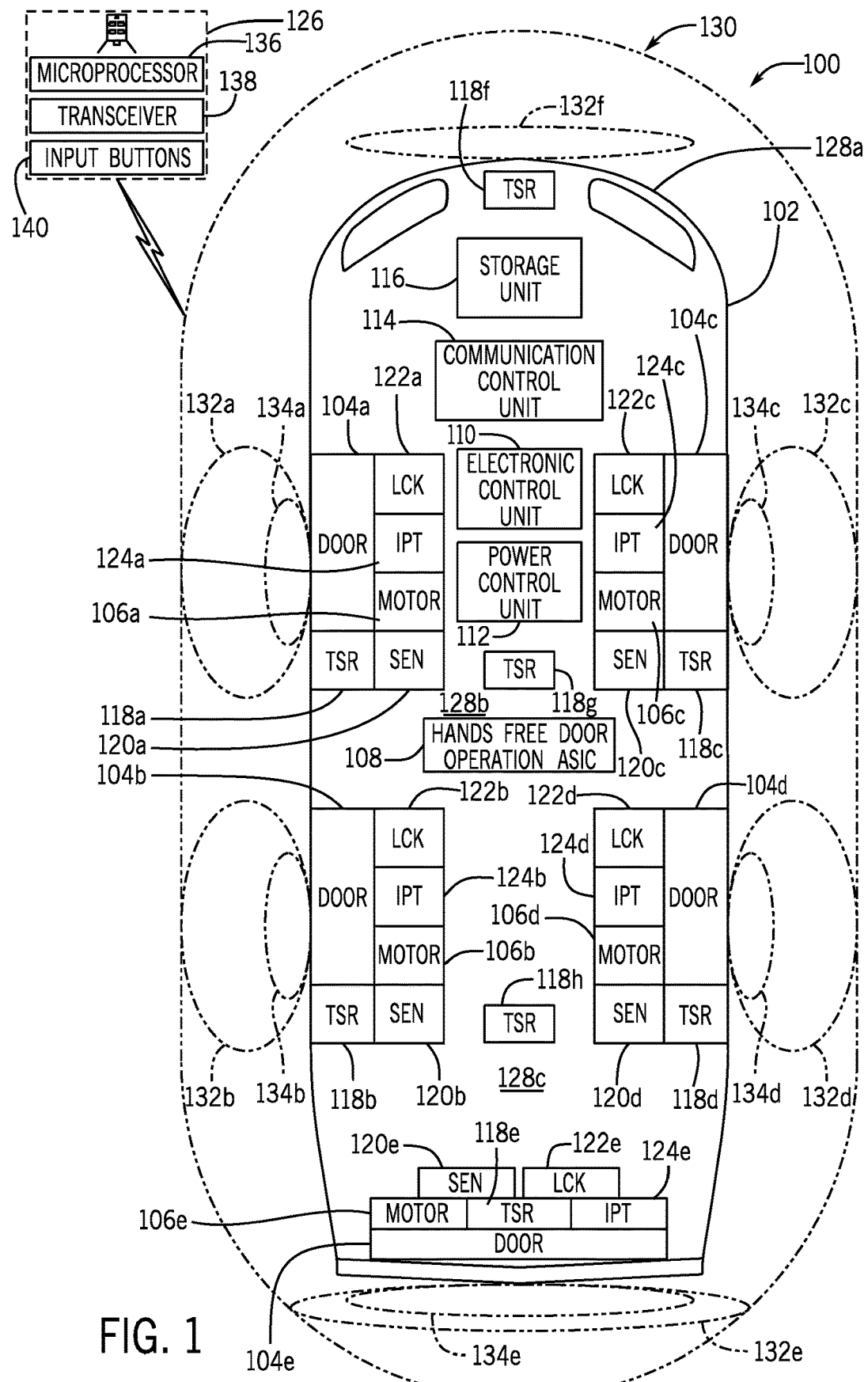
FIG. 1 illustrates a schematic view of an operating environment of a smart entry hands free system for providing hands free operation of a vehicle door according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus,' as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Media Oriented System Transport (MOST), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), a Bluetooth® communication system, a radio frequency communication system (e.g., LF radio frequency), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device" as used herein can include devices for controlling different vehicle features which include various vehicle components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

An "operable connection," as used herein can include a connection by which entities are "operably connected", is one in which signals, physical communications, and/or logical communications can be sent and/or received. An operable connection can include a physical interface, a data interface and/or an electrical interface.

An "output device" as used herein can include devices that can derive from vehicle components, systems, subsystems, and electronic devices. The term "output devices" includes, but is not limited to: display devices, and other devices for outputting information and functions.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system", as used herein can include, but are not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 shows a schematic view of an exemplary operating environment of a smart entry hands free system 100 within a vehicle 102 for providing hands free operation of at least one vehicle door 104a-104e. The components of the system 100, as well as the components of other systems, hardware architectures and software architectures discussed herein, can be combined, omitted or organized into different architecture for various embodiments. However, the exemplary embodiments discussed herein focus on the environment as illustrated in FIG. 1, with corresponding system components, and related methods.

In an exemplary embodiment, hands free operation of the at least one vehicle door 104a-104e may include an automated powered opening and closing of one or more vehicle doors 104a-104e of the vehicle 102 by one or more motors 106a-106e associated with one or more of the respective vehicle doors 104a-104e. The automated powered opening and closing of one or more of the vehicle doors 104a-104e may be conducted so that one or more individuals that wish to access the vehicle 102 may be able to access one or more areas (not shown) of the vehicle 102 from the one or more vehicle doors 104a-104e without having to directly (e.g., physically) or indirectly (e.g., through the use of gestures, pressing of buttons) open and close one or more of the vehicle doors 104a-104e.

As described in more detail below, the automated powered opening and closing of one or more of the vehicle doors 104a-104e may be based on one or more execution commands sent by a hand free door operation application-specific integrated circuit 108 (hereinafter referred to as hand free door ASIC) included as part of an electronic control unit 110 (ECU) of the vehicle 102. The commands may be provided based on determinations that a portable device(s) 126 is located within a predetermined vicinity of the vehicle 102 that is located outside of a space occupied by the vehicle door(s) 104a-104e and is stationary within the predetermined vicinity of the vehicle 102 for a predetermined period of time.

Additionally, in one embodiment, the hand free door ASIC 108 may provide commands to provide an amount of power to close one or more of the vehicle doors 104a-104e based on determinations that the individual(s) (e.g., that is carrying the portable device(s) 126) has provided an input to express an intention to close one or more of the vehicle doors 104a-104e and that the portable device(s) 126 is not (no longer) located within the predetermined vicinity of the vehicle 102. As discussed below, in some embodiments, the hand free door ASIC 108 may provide commands to stop providing the power to close the respective door(s) 104a-104e based on determination that the portable device(s) 126 has been moved back towards the respective door(s) 104a-104e before the automatic (full) closure of the respective door(s) 104a-104e.

In an exemplary embodiment, the ECU 110 operably controls the vehicle 102 and its components that may include, but are not limited to the components shown in FIG. 1. The ECU 110 may include a microprocessor, one or more application-specific integrated circuit(s) (ASICs), or other similar devices. The ECU 110 may also include internal processing memory, an interface circuit, and bus lines for transferring data, sending commands, and communicating with the systems and components of the vehicle 102. Generally, the ECU 110 includes a processor and memory (not shown). The ECU 110 also includes a separate communications device (not shown) for sending data internally in the vehicle 102. In one or more embodiments, the hand free door ASIC 108 may be included in the form of an integrated circuit that is embedded as part of the ECU 110. In some embodiments, the hand free door ASIC 108 may include its own microprocessor and memory (both not shown). In one embodiment, the ECU 110 may operably communicate with a head unit (not shown) of the vehicle 102. The ECU 110 and/or the head unit may send one or more command signals to a plurality of vehicle systems (shown in FIG. 2), that may communicate with the hand free door ASIC 108 to provide one or more notifications to the individual(s).

In one or more embodiments, in addition to the aforementioned components of the system 100, the vehicle 102 may include a power control unit 112, a communication control unit 114, a storage unit 116, one or more transceivers 118a-118h, one or more motion sensors 120a-120e, door locks 122a-122e, and door input buttons 124a-124e. As discussed below, the communication control unit 114 of the vehicle 102 may utilize the one or more transceivers 118a-118h to send and receive communication signals (e.g., low frequency (LF) polling/polling response signals, other RF signals, Bluetooth® signals, and/or Wi-Fi signals) from one or more portable devices 126.

In one embodiment, the storage unit 116 of the vehicle 102 may include various memories such as, for example L1, L2, or L3 cache or system memory. As such, the memory may include static random access memory (SRAM), dynamic RAM (DRAM), flash memory, read only memory (ROM), or other similar memory devices. The storage unit 116 may be utilized to store one or more operating systems, applications, associated operating system data, application data, vehicle system and subsystem user interface data, and the like that may be executed by the ECU 110.

In an exemplary embodiment, as described in more detail below, one or more of the vehicle doors 104a-104e may include, but may not be limited to, a left side front door 104a, a left side rear door 104b, a right side front door 104c, a right side rear door 104d, and a tailgate door 104e. One or more of the vehicle doors 104a-104e may include the associated motor 106a-106e that may operate the respective vehicle doors 104a-104e based on signals sent and received from/by the hand free door ASIC 108. In one or more embodiments, one or more of the vehicle doors 104a-104e may include an automatically lifting door (e.g., lift gate door), a swinging door, or sliding door (specific door configurations not shown) that may be manually opened or closed and/or opened or closed based on the operation of one or more of the associated motors 106a-106e that are supplied power by the power control unit 112 of the vehicle 102.

Additionally, the associated motor 106a-106e may operate the lock 122a-122e of each of the respective vehicle doors 104a-104e based on signals sent and received from/by the hand free door ASIC 108. The lock(s) 122a-122e may function to be locked or unlocked by the respective motor 106a-106e based on the operation of one or more of the associated motors 106a-106e that are supplied power by the power control unit 112 of the vehicle 102. As discussed below, the powered locking or unlocking of one or more of the door locks 122a-122e and/or the opening or closing of the one or more vehicle doors 104a-104e may be determined based on processing completed by the hand free door ASIC 108.

In one or more embodiments, the one or more doors 104a-104e may include the respective door input buttons 124a-124e. As described below in more detail, the door input buttons 124a-124e may communicate with various components of the vehicle 102 including the ECU 110 to partially control operation of one or more of the vehicle doors 104a-104e. For example, the door input buttons 124a-124e may be inputted by an individual carrying the portable device(s) 126 to indicate that the individual intends for the tailgate door 104e to be closed upon walking away from the tailgate door 104e, entering the vehicle 102, placing an object(s) within the vehicle 102, and/or removing object(s) from the vehicle 102.

In one or more embodiments, one or more of the vehicle doors 104a-104e may also include corresponding motion sensors 120a-120e that may be disposed on or near one or more of the vehicle doors 104a-104e. For example, the motion sensors 120a-120e may be disposed in one or more areas that may include, but are not limited to, areas underneath the respective vehicle doors 104a-104e, above the respective vehicle doors 104a-104e, a floor board (not shown) of the vehicle 102 near the respective vehicle doors 104a-104e, a ceiling (not shown) of the vehicle 102 near the respective vehicle doors 104a-104e, and the like.

The one or more motion sensors 120a-120e may include, but are not limited to microwave motion sensors, infrared motion sensors, radar based motion sensors, and the like, and may be utilized to sense the movement of individual(s) and/or object(s) sensed within a predetermined detection range of the one or more motion sensors 120a-120e. In alternate embodiments, the one or more motion sensors 120a-120e may include additional sensors (not shown) that may be used to detect the movement of the individual(s) and/or object(s), such as touch sensors, proximity sensors, field disturbance sensors, and the like. Additionally, the one or more motion sensors 120a-120e may be utilized to sense a moving pattern of the individual(s) and/or object(s) that may include a direction of movement of the individual(s) and/or object(s), and when motion associated with the individual(s) and/or object(s) is no longer sensed within the predetermined detection range of the one or more motion sensors 120a-120e.

In an exemplary embodiment, the communication control unit 114 of the vehicle 102 is operably connected to the one or more transceivers 118a-118h in addition to the ECU 110, the power control unit 112, and the hand free door ASIC 108. The communication control unit 114 may be configured to control operation of the one or more transceivers 118a-118h to send one or more communication signals to the one or more portable devices 126. Additionally, the communication control unit 114 may be configured to control operation of the one or more transceivers 118a-118h to receive one or more communication response signals from the one or more portable devices 126. In an exemplary embodiment, the communication control unit 114 of the vehicle 102 may utilize the one or more transceivers 118a-118h to communicate with the one or more portable devices 126 by transmitting/receiving RF and LF communication signals. However, it is to be appreciated that the communication control unit 114 may utilize the one or more transceivers 118a-118h and/or additional/alternate components of the vehicle 102 to communicate with the one or more portable devices 126 through alternate communication means, including, but not limited to, Bluetooth®, Wi-Fi, and/or similar wireless communication methods.

In one embodiment, the communication control unit 114 may send one or more commands to the transceiver(s) 118a-118h to send one or more types of signals at one or more signal strengths and at one or more frequencies based on one or more commands received by the communication control unit 114 from the hand free door ASIC 108 and/or the ECU 110. Additionally, the communication control unit 114 may send the one or more commands to the transceiver(s) 118a-118h to send one or more types of signals at one or more signal strengths and at one or more frequencies based on one or more amounts of power supplied to the transceivers(s) 118a-118h by the power control unit 112, as may be determined by the hand free door ASIC 108 and/or the ECU 110.

In an exemplary embodiment, the one or more transceivers 118a-118h may be capable of providing wireless computer communications utilizing various protocols to be used to send/receive electronic signals internally to components and systems within the vehicle 102 and to external devices including the one or more portable devices 126. The one or more transceivers 118a-118h may include respective transmitter antennas (not shown) and receiver antennas (not shown) that may be separate components or may be configured as a single component. The one or more transceivers 118a-118h may be included at one or more areas of the vehicle 102 that may be utilized to determine a location of the portable device(s) 126 and/or a movement of the portable device(s) 126 with respect to the vehicle 102 and/or specifically with respect to one or more of the vehicle doors 104a-104e. For example, as shown in FIG. 1, transceivers 118a-118h may be provided within a vicinity of each of the vehicle doors 104a-104e, at a front portion 128a (e.g., hood) of the vehicle 102, at a middle portion 128b of the vehicle 102, and at a rear portion 128c (e.g., trunk) of the vehicle 102 to send and receive signals from various areas around the vehicle 102.

In one or more embodiments, the one or more transceivers 118a-118h may be operably controlled to transmit one or more polling signals to a plurality of zones (e.g., areas around the vehicle 102/one or more vehicle doors 104a-104e) at one or more predetermined polling frequencies to the one or more portable devices 126. In one embodiment, the plurality of zones may include a wide area polling zone 130 and local area polling zones 132a-132f that include a predetermined area(s) around the vehicle 102. In particular, the local area polling zones 132a-132f may include predetermined area(s) around the vehicle 102 that are in close proximity (near) the respective vehicle door(s) 104a-104e.

Additional local area polling zones that are provided at additional areas of the vehicle 102 that may not be shown in FIG. 1 may also be contemplated. For example, in some embodiments, one or more local area polling zones (not shown) may be provided within and outside of the middle portion 128b of the vehicle 102 and/or the rear portion 128c of the vehicle 102. It is to be appreciated that additional zones may be provided between the wide area polling zone 130 and the one or more local area polling zones 132a-132f. For instance, in some embodiments, detection zones (not shown) may be provided that may be located in between the wide area polling zone 130 and the one or more local area polling zones 132a-132f or may encompass one or more of the local area polling zones 132a-132f. For example, a detection zone may be provided that is between a boundary of the wide area polling zone and the boundaries of the local area polling zone 132a and the local area polling zone 132b.

In an exemplary embodiment, predetermined areas within the local area polling zones 132a-132e (located near the respective vehicle doors 104a-104e) may be identified as a plurality of door area zones 134a-134e. In particular, the plurality of door area zones 134a-134e include the predetermined areas within the local area polling zones 132a-132e that include a space that may be occupied by the respective vehicle door(s) 104a-104e when the vehicle door(s) 104a-104e is being opened or closed. The door area zones 134a-134e may represent respective areas near the vehicle doors 104a-104e that may be determined as a space where individuals and/or objects may interfere with the opening and/closing of the respective vehicle doors 104a-104e and may constitute as a hazard with respect to automatically opening and/or closing of the respective vehicle doors 104a-104e. For example, the door area zones 134a-134e may include a maximum amount of space utilized when the vehicle door(s) 104a-104e are being swung opened or swung closed.

In an exemplary embodiment, the one or more portable devices 126 may include, but are not limited to, one or more of electronic key fobs, smart keys, mobile electronic devices, smart phones, remote controls, and the like. Several functions of the vehicle 102 may be controlled by user input that is provided on the one or more portable devices 126 that influence and/or command the ECU 110 and/or hand free door ASIC 108 to control the components of the system 100 based on wireless computer communication between the portable device(s) 126 and the transceiver(s) 118a-118h of the vehicle 102.

In one embodiment, the one or more portable devices 126 may include a microprocessor 136 that is utilized to operably control components of the portable device(s) 126. The microprocessor 136 may include memory, an interface circuit, and bus lines, for transferring data, sending commands, communicating with the various components and controlling an overall operation of the portable device(s) 126. In one embodiment, the microprocessor 136 may store a specific identification code that specifically corresponds to the portable device(s) 126 to be used as an identification mechanism by the vehicle 102.

The one or more portable devices 126 may also include a transceiver 138 that may send and receive electronic signals to and from the vehicle 102. In particular, the transceiver 138 may receive polling signals that are transmitted by the one or more transceivers 118a-118h within the wide area polling zone 130 and the one or more local area polling zones 132a-132f. Upon receipt of the polling signals transmitted by the transceiver(s) 118a-118h of the vehicle 102, the transceiver 138 may transmit one or more LF polling response signals back to the one or more transceivers 118a-118h of the vehicle 102. In an exemplary embodiment, transceiver 138 may communicate with the vehicle 102 by transmitting/receiving RF and LF communication signals. However, it is to be appreciated that the transceiver 138 and/or additional/alternate components of the one or more portable devices 126 may communicate with the vehicle 102 through alternate communication means, including, but not limited to, Bluetooth®, Wi-Fi, and/or similar wireless communication methods.

In one or more embodiments, the one or more portable devices 126 may additionally include input buttons 140 that may include, but are not limited to, door lock buttons, door unlock buttons, door open/close start/stop button (individual buttons not shown). As will be described below, in one embodiment, input of the door open/close start/stop button that may be utilized to start or stop the powered opening or closing of one or more of the vehicle doors 104a-104e.

Figure 2:
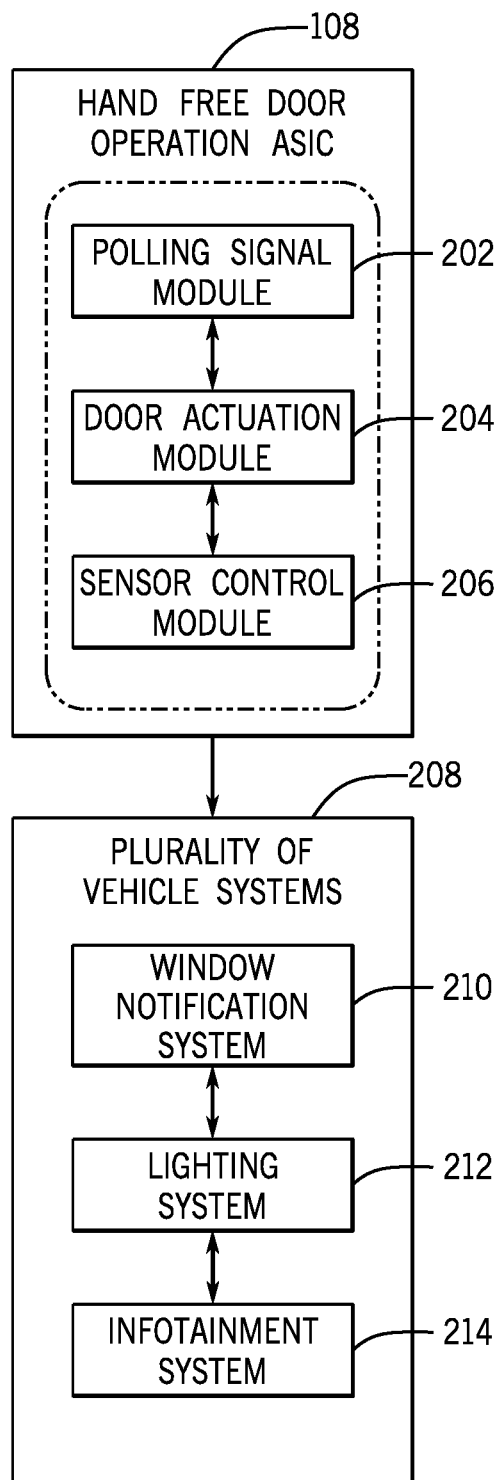
FIG. 2 illustrates a schematic view of an exemplary operating environment of a hand free door operation application-specific integrated circuit according to an exemplary embodiment of the present disclosure.

The hand free door ASIC 108 of the ECU 110 will now be discussed in more detail. FIG. 2 illustrates a schematic view of an exemplary operating environment of hand free door ASIC 108, according to an exemplary embodiment. As shown in FIG. 2, in an illustrative embodiment, the hand free door ASIC 108 may execute and store one or more modules 202-206 that may include a polling signal module 202, a door actuation module 204, and a sensor control module 206.

In operation, the polling signal module 202 of the hand free door ASIC 108 may provide command signals to the communication control unit 114 to send signals to the power control unit 112 to supply one or more predetermined amounts of power to the one or more transceivers 118a-118h. Upon receiving the one or more predetermined amounts of power, the one or more transceivers 118a-118h may be configured to send one or more polling signals to the wide area polling zone 130 and one or more local area polling zones 132a-132f at one or more polling frequencies to be communicated to the portable device(s) 126.

In one embodiment, the polling signal module 202 may communicate with the communication control unit 114 to receive data that pertains to the one or more LF polling response signals that are transmitted by the transceiver 138 of the portable device(s) 126. The polling signal module 202 may interpret the one or more received LF polling response signals and may determine a received signal strength indication (RSSI) of LF polling response signal(s) that are transmitted by the portable device(s) 126.

In an exemplary embodiment, the polling signal module 202 may access and utilize signal strength thresholds that pertain to the one or more LF polling response signals received by the transceiver(s) 118a-118h. The signal strength thresholds may be stored on the storage unit 116 and are indicative of the signal strength(s) of the LF polling response signal(s) that are transmitted by the portable device(s) 126. In other words, the one or more signal strength thresholds may include values that are indicative of RSSI threshold values that are respectively associated to each of the transceivers 118a-118h of the vehicle 102. Therefore, each of the transceivers 118a-118h may be associated with its own set of signal strength thresholds that may be utilized by the polling signal module 202 when it is determined that one or more respective transceivers 118a-118h has received the LF polling response signal(s) from the portable device(s) 126. In other words, the signal strength thresholds associated with one of the transceivers 118a-118h may include unique values (e.g., different values) from signal strength thresholds associated with another of the transceivers 118a-118h. For example, signal strength thresholds that are associated with the transceiver 118a may differ from signal strength thresholds that are associated with the transceiver 118e.

In one or more embodiments, the signal strength thresholds may include local area threshold values that are associated with each transceiver 118a-118h. The local area threshold values may be utilized by the polling signal module 202 to determine an existence of the portable device(s) 126 within or outside of the local area polling zones 132a-132f. In other words, the local area threshold values may be utilized by the polling signal module 202 to determine if the portable device(s) 126 is within one or more of the local area polling zones 132a-132f of the vehicle 102.

More specifically, the local area threshold values may pertain to signal strength values of the received LF polling response signal(s) for each of the transceivers 118a-118h. The local area threshold values may pertain to a respective signal strength value that is used to determine that the portable device(s) 126 is located within one or more of the local area polling zones 132a-132f such that if the received signal strength value is equal to or above one of the local area threshold values, the portable device(s) 126 may be determined to be in one or more of the respective local area polling zones 132a-132f.

Conversely, if the received signal strength value is below the local area threshold values, the portable device(s) 126 may be determined to be in the wide area polling zone 130. Therefore, the polling signal module 202 may utilize the local area threshold values to determine the location of the portable device(s) 126 with respect to the vehicle 102 based on a comparison between the received signal strength of one or more received LF polling response signals transmitted by the portable device(s) 126 and the threshold values. As described below, the hand free door ASIC 108 may utilize this information to provide one or more amounts of power to unlock/lock one or more of the vehicle doors 104a-104e and/or provide further evaluation as to if one or more of the vehicle doors 104a-104e should be opened/closed.

In one or more embodiments, the signal strength thresholds may additionally include door area threshold values that are associated with each transceiver 118a-118h. The door area threshold values may be utilized by the polling signal module 202 to determine an existence of the portable device(s) 126 within or outside of the door area zones 134a-134e of the local area polling zones 132a-132e. In other words, the door area threshold values may be utilized by the polling signal module 202 to determine if the portable device(s) 126 is within one or more of the door area zones 134a-134e of the local area polling zones 132a-132e to possibly indicate that the portable device(s) 126 is located within the space occupied by the vehicle door(s) 104a-104e during opening or closing.

In particular, the door area threshold values may pertain to signal strength values of the received LF polling response signal(s) for each of the transceivers 118a-118h. The door area threshold values may pertain to a respective signal strength value that is used to determine that the portable device(s) 126 is located within one or more of the door area zones 134a-134e such that if the received signal strength value is equal to or above one of the door area threshold values, the portable device(s) 126 may be determined to be in one or more of the respective door area zones 134a-134e, within the space occupied by the vehicle door(s) 104a-104e during opening or closing. Conversely, if the received signal strength value is below the door area threshold values but is equal to or above the local area threshold values, the portable device(s) 126 may be determined to be located within one of the respective local area polling zones 132a-132f, outside of the door area zones 134a-134e.

In an exemplary embodiment, the signal strength thresholds stored on the storage unit 116 may additionally include one or more signal strength deviation threshold values that may provide a maximum deviation of signal strengths between two or more LF polling response signals to determine if the portable device(s) 126 are remaining stationary or being moved within the one or more local area polling zones 132a-132f. The polling signal module 202 may analyze signal strengths associated with two or more received LF polling response signals transmitted by the portable device(s) 126 against the maximum signal strength deviation threshold values associated with one or more of the transceivers 118a-118h to determine if the portable device(s) 126 are remaining stationary for a predetermined period of time within one of the local area polling zones 132a-132f and outside of the door area zones 134a-134e in order to actuate one or more of the motors 106a-106e to open one or more of the vehicle doors 104a-104e.

In one or more embodiments, upon receiving the LF polling response signal(s) from the portable device(s) 126, the communication control unit 114 may analyze data received by the signals and data pertaining to the one or more transceivers 118a-118h that are receiving the LF polling response signal(s). The polling signal module 202 may evaluate the data and may determine which of the one or more transceivers 118a-118h are receiving the LF polling response signal(s). In one embodiment, the polling signal module 202 may determine which one of the transceivers 118a-118h are receiving the LF polling response signal(s) with the highest signal strength and may access the storage unit 116 to retrieve the signal strength thresholds associated with the respective transceiver 118a-118h.

In circumstances in which the polling signal module 202 determines that more than one of the transceivers 118a-118h is receiving the LF polling response signal(s) with the highest signal strength (e.g., more than one transceiver 118a-118h received the LF polling response signal within a predetermined signal strength range), the polling signal module 202 may access the storage unit 116 to retrieve the signal strength thresholds associated with the respective transceivers 118a-118h.

In an exemplary embodiment, the polling signal module 202 may compare the signal strength of the LF polling response signal(s) against the signal strength thresholds associated with the respective transceiver(s) 118a-118h as stored on the storage unit 116 to determine the location and/or movement of the portable device(s) 126 with respect to the vehicle 102. In particular, as described below, the polling signal module 202 may utilize the local area threshold value(s) associated with each of the one or more transceivers 118a-118h to determine if the portable device(s) 126 may be located within one or more of the local area polling zones 132a-132f or the wide area polling zone 130. The polling signal module 202 may additionally utilize the door area threshold value(s) associated with each one of the transceivers 118a-118h to determine if the portable device(s) 126 may be located within one or more of the door area zones 134a-134e. If it is determined that the portable device(s) 126 is located within one or more of the local area polling zones 132a-132f but not within the one or more door area zones 134a-134e, the polling signal module 202 may utilize the one or more signal strength deviation threshold values associated with one or more of the transceivers 118a-118h to determine if the portable device(s) 126 is or is not stationary for a predetermined period of time.

The predetermined period of time utilized by the polling signal module 202 may be a period of time that is deemed to be appropriate for the portable device(s) 126 to be remaining stationary within the one or more of the local area polling zones 132a-132f for the hand free door ASIC 108 to safely actuate powered opening/closing of one or more vehicle doors 104a-104e. The powered opening/closing of the one or more vehicle doors 104a-104e may be individually actuated based on the determination of the location of the portable device(s) 126 within one or more of the local area polling zones 132a-132f that are in closest proximity to the one or more respective vehicle doors 104a-104e.

In an exemplary embodiment, the polling signal module 202 may execute a timer that is utilized to determine if the predetermined period of time has expired to determine if the portable device(s) 126 remains stationary for the predetermined period of time. The timer may actuate a countdown sequence that may include a total time that is representative of the amount of time that is deemed to be appropriate for the portable device(s) 126 to be remaining stationary within the one or more of the local area polling zones 132a-132f (outside of the one or more door area zones 134a-134e) in order for the hand free door ASIC 108 to safely actuate powered opening of one or more vehicle doors 104a-104e determined to be located in closest proximity to the portable device(s) 126.

In an exemplary embodiment, the polling signal module 202 may interpret the one or more LF polling response signals received by the transceiver(s) 118a-118h from the one or more portable devices 126 in the manner discussed above to possibly unlock the lock(s) 122a-122e and/or to open one or more of the vehicle doors 104a-104e. Similarly, the polling signal module 202 may interpret the one or more LF polling response signals to determine the location and movement of the portable device(s) 126 with respect to the vehicle 102 to possibly lock the lock(s) 122a-122e and/or to close one or more of the vehicle doors 104a-104e after being unlocked and opened.

In one embodiment, upon determining the location and the movement of the portable device(s) 126 with respect to the vehicle 102, the polling signal module 202 may send one or more data signals to the door actuation module 204 of the hand free door ASIC 108. The door actuation module 204 may provide one or more commands to the power control unit 112 of the vehicle 102 to supply one or more requisite amounts of power to one or more of the motors 106a-106e to lock and unlock one or more of the door locks 122a-122e of associated vehicle doors 104a-104e. Additionally, the door actuation module 204 may provide one or more commands to the power control unit 112 of the vehicle 102 to supply one or more requisite amounts of power to one or more of the motors 106a-106e to open and/or close one or more of the associated vehicle doors 104a-104e. As will be discussed, in one or more embodiments, the door actuation module 204 may evaluate data provided by the polling signal module 202 and/or the sensor control module 206 to reactively provide the one or more commands to the power control unit 112 to supply the requisite amount(s) of power to lock, unlock, open and/or close one or more of the doors 104a-104e.

As shown in FIG. 2, the hand free door ASIC 108 may operably communicate with a plurality of vehicle systems 208 to provide one or more notifications to the individual(s) carrying the portable device(s) 126 that the polling signal module 202 is determining if the portable device(s) 126 is remaining stationary for the predetermined period of time. These notifications may be provided to inform the individual that if the portable device(s) 126 is to be remaining in the stationary positon for the predetermined period of time (e.g., based on the individual(s) carrying the portable device(s) 126 and standing in a stationary positon) and does not enter the door area zones 134a-134e, the vehicle door(s) 104a-104e may be opened or closed after the expiration of the predetermined period of time.

In particular, the plurality of vehicle systems 208 may include, but may not be limited to, a window notification system 210, a lighting system 212, and an infotainment system 214. However, it is to be appreciated that the plurality of vehicle systems 208 may include additional vehicle systems and vehicle subsystems that are not shown in FIG. 2 (e.g., vehicle navigation system). In an exemplary embodiment, the window notification system 210 may be operably connected to one or more light sources (not shown) that may be disposed within respective windows (not shown) of the vehicle 102 included within the respective vehicle doors 104a-104e. The one or more light sources may be configured as in-glass embedded lighting that may be viewed in one or more colors to present an effect of including one or more textual and/or one or more non-textual graphics etched within one or more portions of the respective windows of the vehicle 102.

In particular, the one or more textual graphics may include text that may be presented based on operation of the hand free door ASIC 108, the ECU 110 in general, and/or one or more additional vehicle systems. The one or more non-textual graphics may include one or more illustrations (e.g., illustration of a vehicle door opening) that may also be presented based on operation of the hand free door ASIC 108, the ECU 110 in general, and/or the one or more additional vehicle systems. As discussed below, the polling signal module 202 may communicate with the window notification system 210 to provide the notification(s) relating to the portable device(s) 126 remaining stationary, upon the polling signal module 202 determining that the portable device(s) 126 is located within one or more of the local area polling zones 132a-132f and is located outside of one or more of the door area zones 134a-134e.

In one embodiment, the lighting system 212 may control one or more external and internal lights not shown) of the vehicle 102. More specifically, the lighting system 212 may control external head lights, tail lights, signal lights, fender lights, and the like based on the operation of the hand free door ASIC 108, the ECU 110 in general, and/or the one or more additional vehicle systems. Additionally, the lighting system 212 may control internal dome lights, dash board lights, center stack lights, door panel lights, and/or interior panel lights based also on the operation of the hand free door ASIC 108, the ECU 110 in general, and/or the one or more additional vehicle systems.

In some embodiments, the lighting system 212 may provide lighting at one or more brightness levels based on the operation of the hand free door ASIC 108. As discussed below, the polling signal module 202 may communicate with the lighting system 212 to provide the notification(s) relating to the portable device(s) 126 remaining stationary, upon the polling signal module 202 determining that the portable device(s) 126 is located within one or more of the local area polling zones 132a-132f and is located outside of one or more of the door area zones 134a-134e.

In one or more embodiments, the infotainment system 214 of the vehicle 102 may control one or more visual and audio notifications that are presented within the vehicle 102 and outside of the vehicle 102. In particular, the infotainment system 214 may be operably connected to one or more display units (not shown), one or more internal speakers (not shown), and one or more external speakers (not shown) of the vehicle 102 to provide notifications to the individual(s) carrying the portable device(s) 126 located within or around the vehicle 102. In an alternate embodiment, a body control module (BCM) (not shown) of the vehicle 102 may control the one or more visual and audio notifications that are presented within the vehicle 102 and outside of the vehicle 102. The BCM may be operably connected to the one or more display units and the one or more internal and/or external speakers of the vehicle 102 to provide the notifications to the individual(s) carrying the portable device(s) 126 located within or around the vehicle 102. The polling signal module 202 may communicate with the infotainment system 214 and/or the BCM to provide the notification(s)

relating to the portable device(s) 126 remaining stationary, upon the polling signal module 202 determining that the portable device(s) 126 is located within one or more of the local area polling zones 132*a*-132*f* and is located outside of one or more of the door area zones 134*a*-134*e*.

In one or more embodiments, the polling signal module 202 may communicate with the window notification system 210 upon determining that the portable device(s) 126 is remaining stationary for a first period of the predetermined period of time within one or more of the local area polling zones 132*a*-132*f* and is outside of the door area zones 134*a*-134*e*. The window notification system 210 may responsively provide a notification in a textual and/or non-textual format that instructs the individual(s) to ensure that the portable device(s) 126 remains in the stationary position for a remaining duration of the predetermined period of time.

Figure 3:
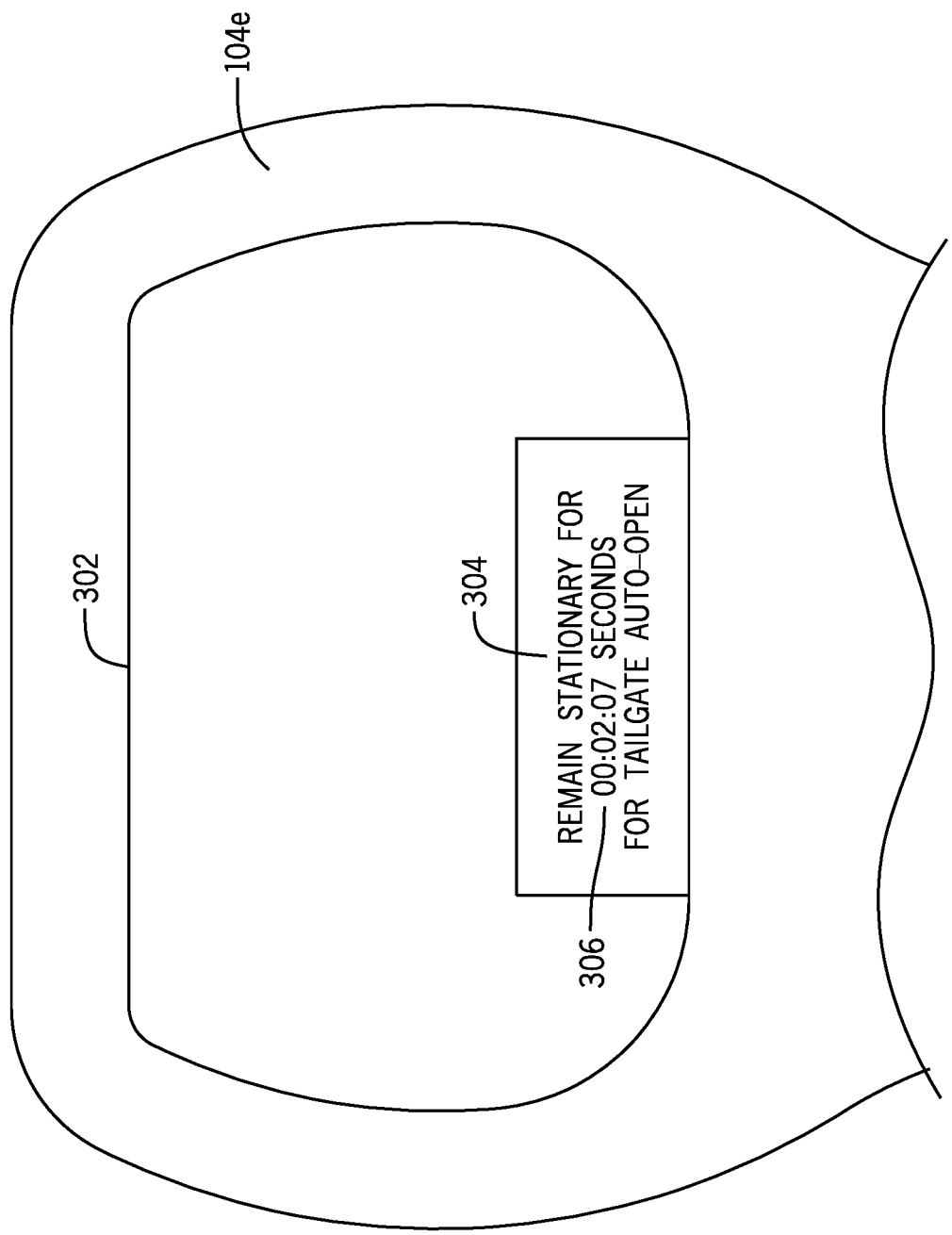
FIG. 3 an illustrative example of a tailgate window of a tailgate door of a vehicle that includes a notification relating to a portable device(s) remaining stationary according to an exemplary embodiment of the present disclosure.

FIG. 3 is an illustrative example of a tailgate window 302 of a tailgate door 104*e* of the vehicle 102 that includes a notification 304 relating to the portable device(s) 126 remaining stationary according to an exemplary embodiment. As an illustrative example, upon determining that the portable device(s) 126 is remaining stationary for the first period of the predetermined period of time within the local area polling zone 132*e* and is located outside of the door area zone 134*e*, the polling signal module 202 may communicate respective data to the window notification system 210. The data may be indicative of the countdown sequence of the timer counting down the amount of time remaining before the expiration of the predetermined period of time. The window notification system 210 may responsively present the notification 304 relating to the portable device(s) 126 remaining stationary.

In particular, the notification 304 may be presented in a textual format as shown that may indicate to the individual(s) that the portable device(s) 126 is to be remaining stationary for a remaining amount of time of the predetermined amount of time to automatically open the tailgate door 104*e*. As shown, the notification 304 may include a countdown notification 306 that may present a countdown timer that counts down the remaining amount of time before the expiration of the predetermined amount of time to automatically open the tailgate door 104*e*. In some embodiments, the notification 304 may additionally include text that indicates to the individual(s) carrying the portable device(s) 126 that they should remain a safe distance away from the tailgate door 104*e* since it will be automatically opened immediately upon the expiration of the predetermined amount of time as the portable device(s) 126 remains stationary within the local area polling zone 132*e*. In additional embodiments, the notification 304 may include one or more illustrative graphics (e.g., presenting a vehicle door opening) during the predetermined amount of time, and/or immediately upon the expiration of the predetermined amount of time as the portable device(s) 126 remains stationary within the local area polling zone 132*e*. The illustrative graphic may provide notification to the individual to ensure that the portable device(s) 126 remains stationary during the predetermined amount of time and that the tailgate door 104*e* is about to be automatically opened to inform the individual carrying the portable device(s) 126 to remain a safe distance behind the tailgate door 104*e* upon the completion of the predetermined amount of time.

Referring again to FIG. 2, in one embodiment, if the polling signal module 202 determines that the portable device(s) 126 does not remain stationary before the expiration of the predetermined period of time, the polling signal module 202 may send a respective signal(s) to the window notification system 210. The window notification system 210 may provide a textual or non-textual notification informing the individual(s) that the portable device(s) 126 did not remain stationary and that the respective vehicle door(s) 104*a*-104*e* will not be automatically opened. In some embodiments, if the portable device(s) 126 is determined to be no longer within the local area polling zone(s) 132*a*-132*f*, the polling signal module 202 may communicate with the window notification system 210 to no longer present the notification of the portable device(s) 126 remaining stationary.

In one or more embodiments, the polling signal module 202 may communicate with the lighting system 212 of the vehicle 102 upon determining that the portable device(s) 126 is remaining stationary for the first period of the predetermined period of time. The lighting system 212 may provide select vehicle lighting (e.g., tailgate lighting) at a full brightness level at the first period of the predetermined period of time and may start dimming as the polling signal module 202 sends data that is indicative of the countdown sequence of the timer counting down the amount of time remaining before the expiration of the predetermined period of time. In other words, during the duration of the predetermined period of time, as the polling signal module 202 executes the timer to countdown the predetermined period of time, the lighting system 212 may present the vehicle light being presented at a full brightness level to a dimming brightness level as the countdown persists.

In one embodiment, if the polling signal module 202 determines that the portable device(s) 126 does not remain stationary before the expiration of the predetermined period of time, the polling signal module 202 may communicate respective data to the lighting system 212. The lighting system 212 may responsively provide the vehicle lighting at the full brightness to provide indication to the individual(s) to ensure that the portable device(s) 126 remains stationary. In some embodiments, if the portable device(s) 126 is determined to be no longer within the local area polling zone(s) 132*a*-132*f*, the polling signal module 202 may communicate respective data to the lighting system 212. The lighting system 212 may responsively disable the vehicle lighting so that the individual is no longer provided the notification.

In an additional embodiment, in addition to or in lieu of communicating with the window notification system 210 and/or the lighting system 212, the polling signal module 202 may communicate with the infotainment system 214 and/or the BCM of the vehicle 102 upon determining that the portable device(s) 126 is remaining stationary for the first period of the predetermined period of time. The infotainment system 214 and/or the BCM may responsively provide one or more audio notifications that are provided via the external speakers of the vehicle 102. In particular, the audio notification(s) may be provided to indicate the timer counting down the amount of time remaining before the expiration of the predetermined period of time and/or the expiration of the predetermined amount of time. Additionally, the infotainment system 214 and/or the BCM may also be utilized to provide one or more audio notifications that are provided via the external speakers to indicate that the portable device(s) 126 has been determined not to have remained stationary for the predetermined amount of time required to automatically open the vehicle door(s) 104*a*-104*e*, upon the polling signal module 202 determining that the portable device(s) 126 does not remain stationary before the expiration of the predetermined period of time.

With reference to the automatic closure of the one or more vehicle doors 104a-104e, the door actuation module 204 may evaluate data from the door input buttons 124a-124e and may provide command signals to the polling signal module 202 and/or the sensor control module 206 to send signals to determine movement of the portable device(s) 126, individual(s) and/or object(s) away from one or more respective vehicle doors 104a-104e that are determined to be open to actuate walk-away closing and locking of the vehicle door(s) 104a-104e. In one embodiment, the polling signal module 202 may determine the location and movement of the portable device(s) 126 with respect to the vehicle 102 after determining that one or more of the door input buttons 124a-124e have been inputted by the individual(s).

In particular, in the circumstance that a respective vehicle door 104a-104e is open, and the door actuation module 204 determines that one or more of the door input buttons 124a-124e have been inputted by the individual(s), the door actuation module 204 may communicate with the polling signal module 202 to determine if the portable device(s) 126 is still within a respective local area polling zone(s) 132a-132e to further determine if the portable device(s) 126 is being moved away from the respective vehicle door(s) 104a-104e. If the polling signal module 202 determines that the portable device(s) 126 is being moved away from the vehicle door(s) 104a-104e, the polling signal module 202 may send one or more respective signals to the door actuation module 204 to actuate closing and/or locking of the vehicle door(s) 104a-104e.

In an exemplary embodiment, the sensor control module 206 of the hand free door ASIC 108 may receive one or more data signals based on data provided by one or more of the motion sensors 120a-120e, the polling signal module 202 and/or the door actuation module 204. In one or more embodiments, the sensor control module 206 may activate one or more of the motion sensors 120a-120e upon determining that one or more of the vehicle doors 104a-104e has been previously opened.

As described below, the sensor control module 206 may also calibrate one or more of the motion sensors 120a-120e to adjust the predetermined detection range of one or more of the motion sensors 120a-120e based on a measured amount of the opening of one or more of the vehicle doors 104a-104e to account for the movement of the individual(s) and/or the object(s) that occur due to the space occupied by the vehicle door(s) 104a-104e during opening or closing. In one or more embodiments, the sensor control module 206 may evaluate data from one or more of the motion sensors 120a-120e and data provided by other components of the vehicle 102 such as the door input buttons 124a-124e and may provide command signals to the door actuation module 204 to send signals to close one or more of the doors 104a-104e of the vehicle 102. The sensor control module 206 may further evaluate data from the one or more motion sensors 120a-120e to send signals to stop the closure of one or more of the doors 104a-104e if it is determined that the individual(s) approaches the space occupied by the one or more of the doors 104a-104e during the powered closure of the respective one or more of doors 104a-104e.

In some embodiments, the door actuation module 204 may evaluate data from the door input buttons 124a-124e and may provide command signals to the sensor control module 206 to determine if movement of the individual(s) or objects is occurring away from space occupied by one or more of the vehicle doors 104a-104e that is open. The door actuation module 204 may also communicate with the sensor control module 206 to further determine if there is any movement of the individual(s) or the object(s) within the space occupied by one or more of the vehicle doors 104a-104e determined to be opened. As discussed below, if the sensor control module 206 determines that movement of the individual(s) and/or objects away from the space occupied by the vehicle door(s) 104a-104e and that there is no movement of the individual(s) and/or object(s) for a predetermined period of time after, the sensor control module 206 may send one or more respective signals to the door actuation module 204 to actuate powered closing and/or locking of the vehicle door(s) 104a-104e.

In additional embodiments, the sensor control module 206 may utilize predetermined gestures to initiate walk away closing and/or locking of one or more vehicle doors 104a-104e. In particular, the sensor control module 206 may access predetermined gesture data that is stored on the storage unit 116 and may determine if the individual(s) carrying the portable device(s) 126 provide a predetermined gesture that may include, but is not limited to, a kicking gesture, a waving gesture, and the like that is captured by one or more of the motion sensors 120a-120e. In some additional embodiments, the sensor control module 206 may communicate with the polling signal module 202 to determine the location and movement of the portable device(s) 126 with respect to the vehicle 102 after determining that the predetermined gestures were sensed by the motion sensor(s) 120a-120e.

In particular, in the circumstance that a respective vehicle door 104a-104e is open, and the sensor control module 206 determines that the predetermined gesture is sensed, the sensor control module 206 may communicate with the polling signal module 202 to determine if the portable device(s) 126 is still within a respective local area polling zone(s) 132a-132e to determine if the portable device(s) 126 is being moved away from the respective vehicle door(s) 104a-104e. If the sensor control module 206 determines that the portable device(s) 126 is being moved away from the vehicle door(s) 104a-104e, the sensor control module 206 may send one or more respective signals to the door actuation module 204 to actuate powered closing and/or locking of the vehicle door(s) 104a-104e. In some embodiments, upon sending the signal(s) to actuate powered closing of the vehicle door(s) 104a-104e, the sensor control module 206 may further evaluate data to determine if the portable device(s) 126 is being moved back towards the vehicle 102 and is located within a predetermined distance of one of the door area zones 134a-134e and may send signals to stop the powered closure of one or more the doors 104a-104e since such a scenario may indicate that the individual(s) carrying the portable device(s) 126 may intend to re-enter or reach into the vehicle 102.

II. Exemplary Methods Utilized by the Hand Free Door ASIC

Figure 4:
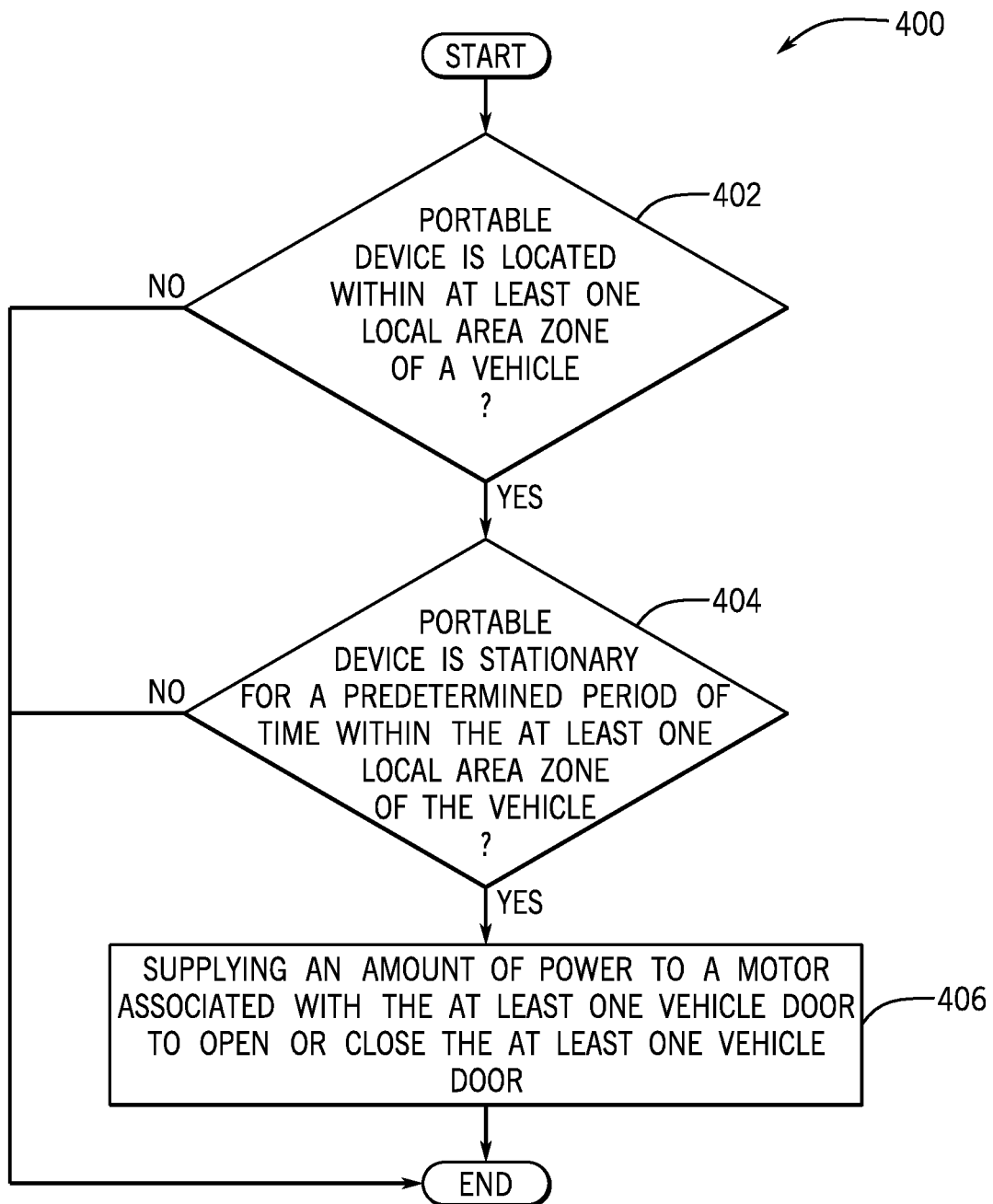
FIG. 4 is a process flow diagram of a method for providing hands free operation of at least one vehicle door according to an exemplary embodiment of the present disclosure.

FIG. 4 is a process flow diagram of a method 400 for providing hands free operation of at least one vehicle door according to an exemplary embodiment of the present disclosure. FIG. 4 will be described with reference to the components of FIG. 1 and FIG. 2 though it is to be appreciated that the method of FIG. 4 may be used with other systems and/or components. The method 400 will be explained in more detail below with reference to FIGS. 5A-5C that include process flow diagrams of a method 500. With reference to FIG. 4, the method 400 may begin at block 402, wherein the method 400 may include determining if a portable device 126 is located within at least one local area polling zone 132a-132f of a vehicle 102.

Figure 5A:
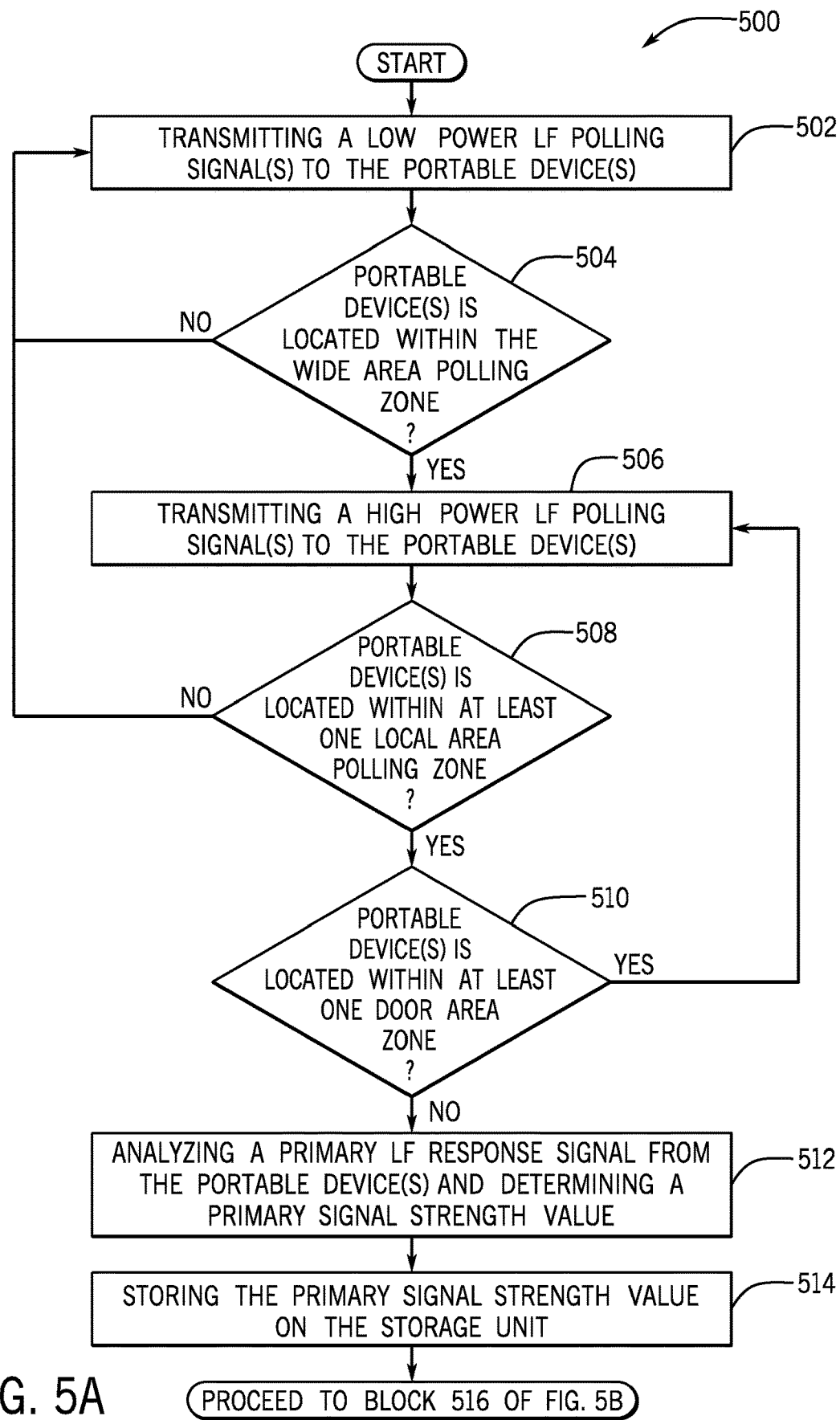
FIG. 5A is a process flow diagram of a first part of a method for providing hands free powered opening of the at least one vehicle door according to an exemplary embodiment of the present disclosure.

Block 402 will be discussed in more detail with respect to FIG. 5A, a process flow diagram of a first part of the method 500 for providing hands free powered opening of the at least one vehicle door 104a-104e according to an exemplary embodiment of the present disclosure. FIG. 5A will be described with reference to the components of FIG. 1 and FIG. 2 though it is to be appreciated that the method of FIG. 5A may be used with other systems and/or components.

As described below, the method 500 will be discussed in three parts with respect to FIG. 5A, FIG. 5B, and FIG. 5C that provide more detail with respect to the blocks 402-406 of the method 400 of FIG. 4. In particular, the method 500 will describe process flows that may be executed by the hand free door ASIC 108 when executing blocks 402-406 of the method 400. The method 500 may begin at block 502, wherein the method 500 may include transmitting a low power LF polling signal to the portable device(s) 126. In an exemplary embodiment, the ECU 110 may determine if the vehicle 102 is parked and the vehicle door(s) 104a-104e is in a locked and closed position. Upon this determination, the ECU 110 may send a signal(s) to the polling signal module 202 of the hand free door ASIC 108 to initiate a portable device polling mode.

In one embodiment, during the portable device polling mode, the polling signal module 202 may send a command signal(s) to the communication control unit 114 to initiate transmission of one or more low power LF polling signals by the transceiver(s) 118a-118h. Upon receipt of the command signal(s), the communication control unit 114 may utilize the transceiver(s) 118a-118h to transmit the one or more low power LF polling signals that reaches a predetermined distance within the wide area polling zone 130. The communication control unit 114 may be configured to control the transceiver(s) 118a-118h to transmit a predetermined number of LF low power polling signals within a predetermined time period. In some embodiments, the communication control unit 114 may be configured to control the transceiver(s) 118a-118h to transmit the low power LF polling signal(s) at a predetermined frequency (e.g., every 600 ms) to determine if the portable device(s) 126 is located within the wide area polling zone 130.

The method 500 may proceed to block 504, wherein the method 500 may include determining if the portable device(s) 126 is located within the wide area polling zone 130. In an exemplary embodiment, if the portable device(s) 126 (e.g., the individuals(s) carrying the portable device(s) 126) is located within the wide area polling zone 130, the transceiver 138 of the portable device(s) 126 may receive the low power LF polling signal(s) transmitted by the transceivers 118a-118h of the vehicle 102. Upon receiving the low power LF polling signal, the microprocessor 136 of the portable device(s) 126 may instruct the transceiver 138 of the portable device(s) 126 to transmit one or more long range LF polling response signals to the vehicle 102. In some embodiments, the one or more long range LF polling response signals may include a plurality of long range LF polling response signals that may contain the specific identification code that is stored on the microprocessor 136 that specifically corresponds to the portable device(s) 126 to be used as an identification mechanism by the ECU 110 of the vehicle 102.

Upon receipt of the LF polling response signals by one or more of the transceivers 118a-118h, the communication control unit 114 may analyze data received by the signals and data pertaining to the one or more transceivers 118a-118h received by the LF polling response signal(s) and may further communicate one or more LF polling response data signals to the polling signal module 202. Upon receipt of the one or more LF polling response data signals, the polling signal module 202 may evaluate the data and may determine the signal strength of at least one of the received LF response polling signal(s). Additionally, the polling signal module 202 may evaluate the data from the LF polling response data signal(s) and may determine the one or more transceivers 118a-118h of the vehicle 102 that received the LF polling response signal(s) transmitted by the portable device(s) 126. The polling signal module 202 may determine which one of the transceivers 118a-118h received the LF polling signal with the highest signal strength and may access the storage unit 116 to retrieve the signal strength thresholds associated with the respective transceiver 118a-118h.

In an exemplary embodiment, the polling signal module 202 may compare the determined signal strength(s) of the LF polling response signal(s) received by the transceiver(s) 118a-118h against the signal strength thresholds associated with the respective transceiver(s) 118a-118h as stored on the storage unit 116. In particular, the polling signal module 202 may compare the determined signal strength(s) of the LF polling response signal(s) against the local area threshold value(s) associated with the one or more transceivers 118a-118h which are determined to have received the LF polling signal with the highest signal strength to determine if the portable device(s) 126 may be located within the wide area polling zone 130. If the polling signal module 202 determines that the determined signal strength(s) of the LF polling response signal(s) is below the local area threshold value(s) associated with the one or more transceivers 118a-118h which are determined to have received the LF polling response signal with the highest signal strength, the polling signal module 202 may determine that the portable device(s) 126 is located within the wide area polling zone 130.

If it is determined that the portable device(s) 126 is located within the wide area polling zone 130 (at block 504), the method 500 may proceed to block 506, wherein the method 500 may include transmitting a high power LF polling signal to the portable device(s) 126. In one embodiment, during the portable device polling mode, the polling signal module 202 may send a command signal(s) to the communication control unit 114 to initiate transmission of one or more high power LF polling signals by the transceiver(s) 118a-118h. Upon receipt of the command signal(s), the communication control unit 114 may utilize the transceiver(s) 118a-118h to transmit the one or more high power LF polling signals that reaches the entirety of each of the local area polling zones 132a-132f. The communication control unit 114 may be configured to control the transceiver(s) 118a-118h to transmit a predetermined number of high power LF polling signals within a predetermined time period. In one embodiment, the communication control unit 114 may be configured to control the transceiver(s) 118a-118h to transmit the high power LF polling signals at a predetermined frequency (e.g., once per every 100 ms) to determine if the portable device(s) 126 is located within at least one of the local area polling zone(s) 132a-132f.

With continued reference to FIG. 5A, the method 500 may proceed to block 508, wherein the method 500 may include determining if the portable device(s) 126 is located within at least one local area polling zone(s) 132a-132f. In an exemplary embodiment, if the portable device(s) 126 is located within one or more of the local area polling zones 132a-132f, the transceiver 138 of the portable device(s) 126 may receive the high power LF polling signal(s) transmitted by the transceivers 118a-118h of the vehicle 102. Upon receiving the high power LF polling signal(s), the microprocessor 136 of the portable device(s) 126 may instruct the transceiver 138 to send one or more (short range) LF polling response signals within a predetermined frequency (e.g., once per every 500 ms). In one embodiment, the polling response signals may include the specific identification code that is stored on the microprocessor 136 that specifically corresponds to the portable device(s) 126 to be used as an identification mechanism by the ECU 110 of the vehicle 102.

Upon receipt of the short range LF polling response signals by one or more of the transceivers 118a-118h, the communication control unit 114 may analyze data received by the signals and data pertaining to the one or more transceivers 118a-118h that received the LF polling response signal(s) and may communicate one or more LF polling response data signals to the polling signal module 202. Upon receipt of the one or more LF polling response data signals, the polling signal module 202 may evaluate the data and may determine the signal strength of at least one of the received LF polling response signal(s). Additionally, the polling signal module 202 may evaluate the data from the short range power LF polling response data signal(s) and may determine the one or more transceivers 118a-118h of the vehicle 102 that received the LF polling response signal(s) transmitted by the portable device(s) 126. As discussed above, the polling signal module 202 may determine which one of the transceivers 118a-118h received the LF polling response signal with the highest signal strength and may access the storage unit 116 to retrieve the signal strength thresholds associated with the respective transceiver 118a-118h.

In an exemplary embodiment, the polling signal module 202 may compare the determined signal strength(s) of the LF polling response signal(s) received by the transceiver(s) 118a-118h against the signal strength thresholds associated with the respective transceiver(s) 118a-118h as stored on the storage unit 116. In particular, the polling signal module 202 may compare the determined signal strength(s) of the LF polling response signal(s) against the local area threshold value(s) associated with the one or more transceivers 118a-118h which are determined to have received the LF polling response signal with the highest signal strength to determine if the portable device(s) 126 may be located within at least one of the local area polling zones 132a-132f.

More specifically, if the polling signal module 202 determines that the determined signal strength(s) of the LF polling response signal(s) is equal to or above the local area threshold value(s) associated with one or more of the transceivers 118a-118h which are determined to have received the LF response polling signal(s) with the highest signal strength, the polling signal module 202 may then determine that the portable device(s) 126 is located within the respective local area polling zone(s) 132a-132f. The respective local area polling zone(s) 132a-132f may be located at a close proximity to the one or more transceivers 118a-118h which are determined to have received the LF response polling signal(s) with the highest signal strength. In one embodiment, the polling signal module 202 may be able to determine a location of the portable device(s) 126 within the local area polling zone(s) 132a-132f by determining and evaluating a difference between the signal strength(s) of the LF polling response signal(s) and the local area threshold value(s) associated with the one or more transceivers 118a-118h which are determined to have received the LF polling response signal(s) with the highest signal strength.

As an illustrative example, if the transceiver 118e is determined to receive the LF polling response signal(s) with the highest signal strength from the portable device 126, the polling signal module 202 may compare the signal strength of the LF polling response signal(s) received against the local area threshold value associated with the transceiver 118e. If the signal strength of the LF polling response signal(s) is equal to or above the local area threshold value, the polling signal module 202 may determine that the portable device(s) 126 is located within the local area polling zone 132e which is in closest proximity to the transceiver 118e and the tailgate door 104e. The polling signal module 202 may additionally determine the difference between the signal strength of the LF polling response signal(s) and the local area threshold value associated with the transceiver 118e and may further determine the location of the portable device(s) 126 within the local area polling zone 132e.

As discussed, the method 500 provides additional detail with respect to the blocks 402-406 of the method 400 of FIG. 4. Accordingly, blocks 502-508 discussed above provide additional details as to determining that the portable device 126 is located within at least one local area zone of the vehicle 102, as determined at block 402 of the method 400. With reference to FIG. 4, upon determining that the portable device 126 is located within the at least one local area polling zone 132a-132f of the vehicle 102 (at block 402), the method 400 proceeds to block 404, wherein the method 400 may include determining if a portable device 126 is stationary for a predetermined period of time within the at least one local area polling zone 132a-132f of the vehicle 102. In an exemplary embodiment, the polling signal module 202 may make the aforementioned determination to further determine if the portable device(s) 126 is stationary (e.g., individual(s) carrying the portable device(s) 126 is standing still) within the respective local area polling zone(s) 132a-132f outside of the door area zones 134a-134e of the local area polling zone(s) 132a-132f. As discussed above, the hand free door ASIC 108 may utilize the determination of if the portable device(s) 126 is remaining stationary for a predetermined period of time to send signals to open or close the respective vehicle door(s) 104a-104e.

With reference again to the method 500 of FIG. 5A, at block 510, the method 500 may include determining if the portable device(s) 126 is located within at least one door area zone 134a-134e. In an exemplary embodiment, upon determining the local area polling zone(s) 132a-132f that the portable device 126(a) is located within (at block 508), the polling signal module 202 will determine if the portable device(s) 126 is located within at least one door area zone 134a-134e. In other words, if it is determined (at block 508) that the portable device(s) 126 is located within the local area polling zone 132f (that does not directly include any of the vehicle doors 104a-104e), the polling signal module 202 may determine that the portable device(s) 126 is not located within at least one door area zone.

In one embodiment, if it is determined that the portable device(s) 126 is located within at least one of the local area polling zones 132a-132e, the polling signal module 202 may further evaluate the LF polling response signal(s) to determine if the portable device(s) 126 is located within one or more of the door area zones 134a-134e. In an exemplary embodiment, the polling signal module 202 may compare the determined signal strength(s) of the LF polling response signal(s) against the door area threshold value(s) associated with the one or more transceivers 118a-118h that are in closest proximity to the local area polling zone(s) 132a-132e in which the portable device(s) 126 is located. This comparison is conducted to determine if the portable device(s)

126 may be located within at least one of the door area zones 134a-134e of the local area polling zone(s) 132a-132e.

More specifically, if the polling signal module 202 determines that the determined signal strength(s) of the LF polling response signal(s) is equal to or above the door area threshold value(s) associated with one or more of the respective transceivers 118a-118h, the polling signal module 202 may consequently determine that the portable device(s) 126 is located within the respective door area zone(s) 134a-134e. In one embodiment, the polling signal module 202 may be able to determine a specific location of the portable device(s) 126 within the door area zone(s) 134a-134e by determining and evaluating a difference between the signal strength(s) of the LF polling response signal(s) and the door area threshold value(s) associated with the one or more transceivers 118a-118h that are in closest proximity to the local area polling zone(s) 132a-132f in which the portable device(s) 126 is determined to be located.

As an illustrative example, if the portable device(s) 126 is determined to be located in the local area polling zone 132e, the polling signal module 202 may compare the signal strength of the LF polling response signal(s) received against the door area threshold value associated with the transceiver 118e. If the signal strength of the LF polling response signal(s) is equal to or above the door area threshold value associated with the door area zone 134e, the polling signal module 202 may determine that the portable device(s) 126 is located within the door area zone 134e which is in closest proximity to the transceiver 118e and the tailgate door 104e. The polling signal module 202 may additionally determine the difference between the signal strength of the LF polling response signal(s) and the door area threshold value associated with the transceiver 118e and may further determine the location of the portable device(s) 126 within the door area zone 134e. This determination may enable the polling signal module 202 to determine that the portable device(s) 126 may be located within the space occupied by the tailgate door 104e as it opens or closes.

With continued reference to the method 500 of FIG. 5A, if it is determined that the portable device(s) 126 is located within at least one door area zone (at block 510), the method 500 may revert back to block 506, wherein the method 500 may include transmitting a high power LF polling signal(s) to the portable device(s) 126. If it is determined that the portable device 126 is not located within at least one door area zone (at block 510), the method 500 may proceed to block 512, wherein the method 500 may include analyzing a primary LF polling response signal from the portable device(s) 126 and determining a primary signal strength value. In an exemplary embodiment, upon determining that the portable device(s) 126 is located within the at least one local are polling zone 132a-132f (at block 508) and determining that the portable device(s) 126 is not located within at least one door area zone 134a-134e (at block 510), the polling signal module 202 may send a command signal(s) to the communication control unit 114 to reinitiate transmission of one or more high power LF polling signals by the transceiver(s) 118a-118h. Upon receipt of the command signal(s), the communication control unit 114 may utilize the transceiver(s) 118a-118h that are near to the local area polling zone(s) 132a-132e in which the portable device(s) 126 is determined to be located to transmit the one or more high power LF polling signals. The one or more high power LF polling signals may reach the entirety of respective local area polling zone(s) 132a-132f in which the portable device(s) 126 is determined to be located.

Upon the portable device(s) 126 receiving the one or more high power LF polling signals, the transceiver 138 of the portable device(s) 126 may send a LF polling response signal to the transceiver(s) 118a-118h. The communication control unit 114 may communicate data from the received LF polling response signal from the transceiver(s) 118a-118h of the vehicle 102 that are in closest proximity to the local area polling zone(s) 132a-132f in which the portable device(s) 126 is determined to be located to the polling signal module 202. Upon receiving the data pertaining to the LF polling response signal, the polling signal module 202 may identify the LF polling response signal as a primary LF polling response signal.

In one embodiment, the polling signal module 202 may analyze the primary LF polling response signal and may determine the signal strength of the primary LF polling response signal based on the LF polling response signal received by the transceiver(s) 118a-118h of the vehicle 102 that are in closest proximity to the local area polling zone(s) 132a-132f in which the portable device(s) 126 is determined to be located. Upon determining the signal strength of the primary LF polling response signal, the polling signal module 202 may determine a primary signal strength value that is indicative of the signal strength of the primary LF polling response signal.

The method 500 may proceed to block 514, wherein the method 500 may include storing the primary signal strength value on the storage unit 116. In one or more embodiments, upon determining the primary signal strength value, the polling signal module 202 may access the storage unit 116 and may store the primary signal strength value on the storage unit 116. In some embodiments, the primary signal strength value may be accessible to the polling signal module 202 until the portable device(s) 126 is determined to no longer be located within the respective local area polling zone(s) 132a-132f or vehicle door(s) 104a-104e is opened (e.g., manually opened by the individual(s) carrying the portable device(s) 126).

Figure 5B:
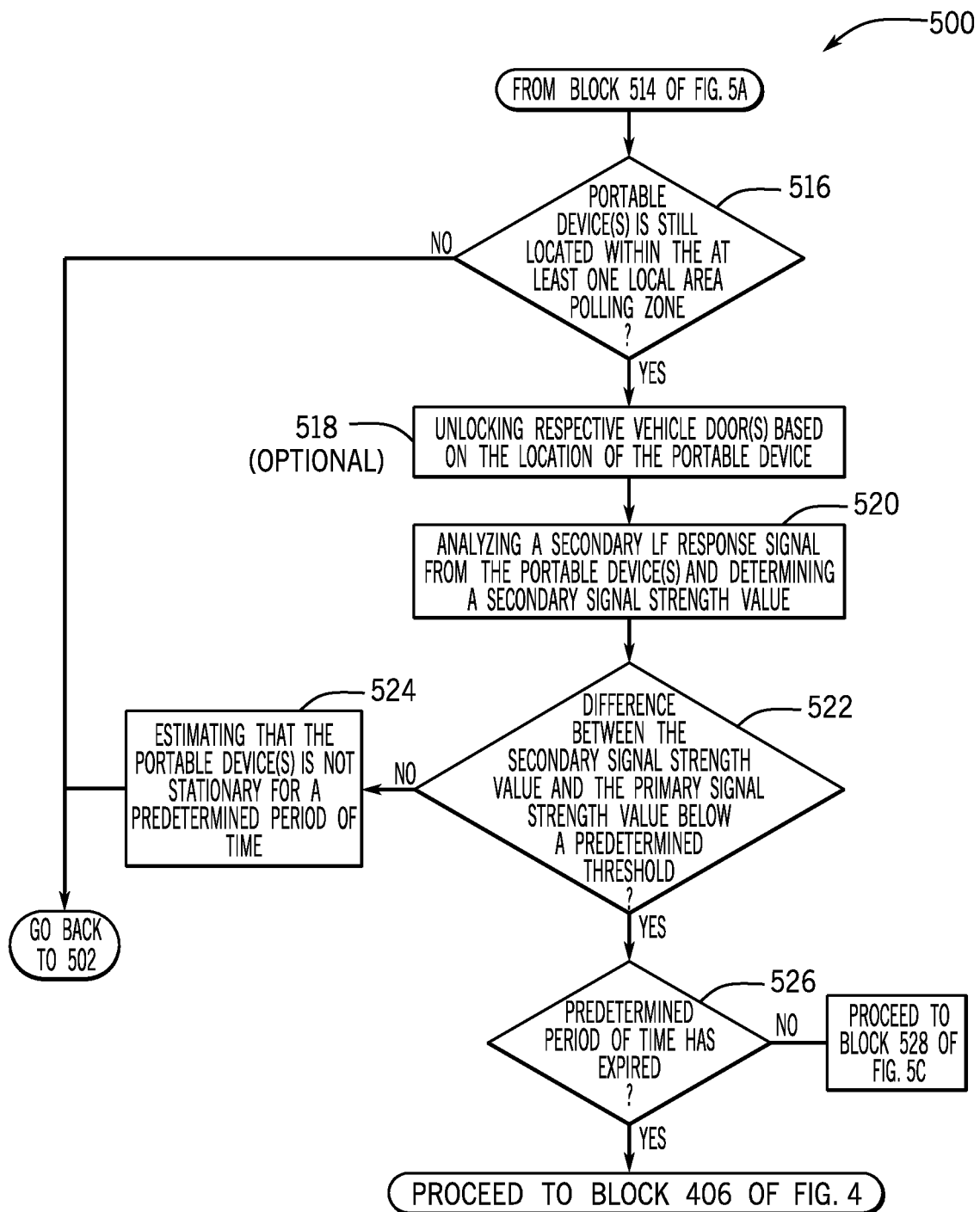
FIG. 5B is a process flow diagram of a second part of the method for providing hands free powered opening of the at least one vehicle door according to an exemplary embodiment of the present disclosure.

FIG. 5B is a process flow diagram of a second part of the method 500 for providing hands free powered opening of the at least one vehicle door 104a-104e according to an exemplary embodiment of the present disclosure. FIG. 5B will also be described with reference to the components of FIG. 1 and FIG. 2 though it is to be appreciated that the method of FIG. 5B may be used with other systems and/or components. FIG. 5B continues to provide additional detail with respect to block 404 of the method 400 of FIG. 4.

As shown in FIG. 5B, the method 500 may proceed to block 516, wherein the method 500 may include determining if the portable device(s) 126 is still located within the at least one local area polling zone(s) 132a-132f. In one embodiment, the polling signal module 202 may send a command signal(s) to the communication control unit 114 to reinitiate transmission of one or more high power LF polling signals by the transceiver(s) 118a-118h. Upon receipt of the command signal(s), the communication control unit 114 may utilize the transceiver(s) 118a-118h that are in close proximity to the local area polling zone(s) 132a-132e in which the portable device(s) 126 is determined to be located to transmit the one or more high power LF polling signals. The one or more high power LF polling signals may reach the entirety of respective local area polling zone(s) 132a-132f in which the portable device(s) 126 is determined to be located.

If the portable device(s) 126 is still located within the respective local area polling zone(s) 132a-132f, upon receiving the one or more high power LF polling signals, the transceiver 138 of the portable device(s) 126 may send a LF polling response signal to the transceiver(s) 118a-118h. Upon receipt of the LF polling response signal by the transceiver(s) 118a-118h that are in close proximity to the local area polling zone(s) 132a-132e in which the portable device(s) 126 is determined to be located, data from the received LF polling response signal may be communicated to the polling signal module 202 by the communication control unit 114. The polling signal module 202 may determine that the portable device(s) 126 is still located within at least one local area polling zone(s) 132a-132e in which it was determined to be located (as discussed with reference to block 508) based on the receipt of the data from the received LF polling response signal. Conversely, the portable device(s) 126 is no longer located within the respective local area polling zone(s) 132a-132f, the polling signal module 202 will not receive the data from the received LF polling response signal and may therefore determine that the portable device(s) 126 is no longer located within the local area polling zone(s) 132a-132f. In the circumstance in which the portable device(s) 126 is no longer located within the respective local area polling zone(s) 132a-132d, the method 500 may revert to block 502, wherein the method 500 may include transmitting a low power LF polling signal(s) to the portable device(s) 126.

If it is determined that the portable device(s) 126 is still located within the at least one local area polling zone 132a-132f (at block 516), the method 500 may proceed to optional block 518, wherein the method 500 may optionally include unlocking respective vehicle door(s) 104a-104e based on the location of the portable device(s) 126. In an exemplary embodiment, upon determining the portable device(s) 126 is still located within at least one of the local area polling zone(s) 132a-132f, the polling signal module 202 may send a corresponding signal(s) to the door actuation module 204 that may indicate the local area polling zone(s) 132a-132f in which the portable device(s) 126 is determined to be located. In one or more embodiments, the corresponding signal(s) may be sent to the door actuation module 204 immediately prior to sending signal(s) to supply power to the one or more motors 106a-106e to open one or more of the respective vehicle doors 104a-104e.

In one embodiment, upon receipt of the signal(s), the door actuation module 204 may determine the vehicle door(s) 104a-104e that is located in close proximity to the local area polling zone(s) 132a-132f in which the portable device(s) 126 is determined to be located. The door actuation module 204 may send a command signal(s) to the power control unit 112 to supply a predetermined amount of power to the motor(s) 106a-106e associated with the vehicle door(s) 104a-104e that is located in close proximity to the local area polling zone(s) 132a-132f to unlock the lock(s) 122a-122e of the respective vehicle door(s) 104a-104e.

In one or more embodiments, when the portable device(s) 126 is located within one of the respective local area polling zones 132a-132f the door actuation module 204 may send the command signal(s) to the power control unit 112 to supply the predetermined amount of power to the one or more motors 106a-106d. In particular, the command signal(s) may be sent to the one or more motors 106a-106d associated with the one or more respective vehicle doors 104a-104d that are located at the front portion 128a and/or the middle portion 128b of the vehicle 102 to unlock the lock(s) 122a-122d of the respective vehicle door(s) 104a-104d. When the portable device(s) 126 is located within the polling zone 132e, the door actuation module 204 may send the command signal(s) to the power control unit 112 to supply the predetermined amount of power to the motor 106e to unlock the lock 122e of the tailgate door 104e.

In an illustrative example, if the portable device(s) 126 is determined to be located within the local area polling zone 132a, the door actuation module 204 may send the command signal(s) to unlock the lock 122a of the left side front door 104a. Alternatively, if the portable device(s) 126 is determined to be located within the local area polling zone 132e, the door actuation module 204 may send the command signal(s) to directly open the tailgate door 104e as long as the portable device(s) 126 is not determined to be located within the door area zone 134e.

In an additional embodiment, upon receipt of the signal(s), the door actuation module 204 may determine the portion of the vehicle 102 that is in closest proximity to the local area polling zone(s) 132a-132f in which the portable device(s) 126 is determined to be located. The door actuation module 204 may send a command signal(s) to the power control unit 112 to supply a predetermined amount of power to the motor(s) 106a-106e associated with the vehicle door(s) 104a-104e that is determined to be located at the portion of the vehicle 102 that is in closest proximity to the local area polling zone(s) 132a-132f to unlock the lock(s) 122a-122e of the respective vehicle door(s) 104a-104e.

In an illustrative example, if the portable device(s) 126 is determined to be located within the local area polling zone 132a, the door actuation module 204 may send the command signal(s) to unlock the lock 122a of the left side front door 104a and the lock 122b of the left side rear door 104b as the respective door locks 122a, 122b and vehicle doors 104a, 104b are located at a left portion of the vehicle 102. Similarly, if the portable device(s) 126 is determined to be located within the local area polling zone 132f, the door actuation module 204 may send the command signal(s) to unlock the lock 122a of the left side front door 104a and the lock 122c of the right side front door 104c as they are located at the front portion 128a of the vehicle 102.

With continued reference to FIG. 5B, the method 500 may proceed to block 520, wherein the method 500 may include analyzing a second LF polling response signal from the portable device(s) 126 and determining a secondary signal strength value. As discussed above (with respect to block 508), upon receipt of the LF polling response signal by the transceiver(s) 118a-118h that are in close proximity to the local area polling zone(s) 132a-132e in which the portable device(s) 126 is determined to be located, data from the received LF polling response signal may be communicated to the polling signal module 202 by the communication control unit 114. Upon receiving the data pertaining to the LF polling response signal, the polling signal module 202 may identify the LF polling response signal as a secondary LF polling response signal.

In one embodiment, the polling signal module 202 may analyze the secondary LF polling response signal and may determine the signal strength of the secondary LF polling response signal. Upon determining the signal strength of the secondary LF polling response signal, the polling signal module 202 may determine a secondary signal strength value that is indicative of the signal strength of the secondary LF polling response signal.

The method 500 may proceed to block 522, wherein the method 500 may include determining if a difference between the secondary signal strength value and the primary signal strength value is below a predetermined threshold. In an exemplary embodiment, the polling signal module 202 may access the storage unit 116 to retrieve the primary signal strength value which was previously stored on the storage unit 116 by the polling signal module 202 (as discussed at block 514). The polling signal module 202 may compute a difference between the secondary signal strength value and the primary signal strength value and output a primary/secondary difference value. It is to be appreciated that in circumstances in which the polling signal module 202 determines that the portable device(s) 126 is located within more than one of the local area polling zones 132a-132f (e.g., portable device 126 is located within and between the local area polling zone 132a and the local area polling zone 132b), the polling signal module 202 may access the storage unit 116 to retrieve the primary signal strength values associated with the transceivers 118a-118h that are in closest proximity to the local area polling zones 132a-132f (e.g., the transceiver 118a in closest proximity to the local area polling zone 132a, and the transceiver 118b in closest proximity to the local area polling zone 132b). The polling signal module 202 may compute a respective difference value between the second signal strength values and the primary signal strength values for each of the respective transceivers 118a-118h.

In an exemplary embodiment, upon computing the signal strength difference value of the secondary and the primary signal strength values, the polling signal module 202 may access the storage unit 116 to retrieve the one or more signal strength deviation threshold values that are associated with the transceiver(s) 118a-118h that are near to the local area polling zone(s) 132a-132e in which the portable device(s) 126 is determined to be located. As discussed above, the one or more signal strength deviation threshold values may provide a maximum deviation of signal strength between two or more LF polling response signals to determine if the portable device(s) 126 are stationary or moving within the one or more local area polling zones 132a-132f. It is to be appreciated that in circumstances in which the polling signal module 202 determines that the portable device(s) 126 is located within more than one of the local area polling zones 132a-132f, the polling signal module 202 may access the storage unit 116 to retrieve the signal strength thresholds associated with the transceivers 118a-118h that are in closest proximity to the local area polling zones 132a-132f.

In one embodiment, upon retrieving the signal strength deviation threshold value(s), the polling signal module 202 may compare the primary/secondary difference value(s) to the signal strength deviation threshold value(s). If the polling signal module 202 determines that the primary/secondary differential value(s) is below the signal strength deviation threshold value(s), the polling signal module 202 may determine that the primary/secondary difference value(s) is within a predetermined stationary range and that the portable device(s) 126 is remaining stationary. The predetermined stationary range may include a range of difference values that may indicate an estimation that the portable device(s) 126 are remaining in a stationary position within the respective local area polling zone(s) 132a-132f.

As an illustrative example, the polling signal module 202 may determine the difference between the secondary signal strength value and the primary signal strength value and may output the primary/secondary difference value of 40h. The polling signal module 202 may compare the primary/secondary difference value of 40h against the signal strength deviation threshold value of 100h and may determine that the portable device(s) 126 is within the predetermined stationary range (−100h to 100h) and that the portable device(s) 126 is remaining stationary.

In one or more embodiments, the polling signal module 202 may operably communicate with a plurality of vehicle systems 208 to provide one or more notifications to the individual(s) carrying the portable device(s) 126. The notifications may be provided to inform the individual that if the portable device(s) 126 remains in the stationary positon for the predetermined period of time and is not moved to the door area zones 134a-134e, the vehicle door(s) 104a-104e may be opened or closed after the expiration of the predetermined period of time. In one or more embodiments, the polling signal module 202 may communicate with the window notification system 210, the lighting system 212, the infotainment system 214, and/or the BCM to provide the notifications that may include a countdown notification that may present a countdown timer that counts down the remaining amount of time before the expiration of the predetermined amount of time to automatically open the respective vehicle door(s) 104a-104e. The countdown timer may actuate a countdown sequence that may include a total time that is representative of the amount of time that is deemed to be appropriate for the portable device(s) 126 to be remaining stationary within the one or more of the local zones 132a-132f in order for the hand free door ASIC 108 to safely actuate powered opening of one or more vehicle doors 104a-104e determined to be located in close proximity to the portable device(s) 126.

If it is determined that the difference between the secondary signal strength value and the primary signal strength value is not below the predetermined threshold (at block 522), the method 500 may proceed to block 524, wherein the method 500 may include estimating that the portable device(s) 126 is not stationary within the at least one local area polling zone 132a-132f. In one embodiment, if the polling signal module 202 determines that the primary/secondary difference value is above the signal strength deviation threshold value(s), the polling signal module 202 may determine that the primary/secondary difference value is not within the predetermined stationary range. Therefore, the polling signal module 202 may determine that the portable device(s) 126 is not remaining stationary. The method 500 may then revert back to block 502, wherein the method 500 may once again include transmitting a low power LF polling signal(s) to the portable device(s) 126, as discussed in detail above. In one embodiment, the polling signal module 202 may operably communicate with a plurality of vehicle systems 208 to provide a notification to the individual(s) that the portable device(s) 126 have been determined not to have remained stationary for the predetermined amount of time required to automatically open the vehicle door(s) 104a-104e.

With continued reference to FIG. 5B, if it is determined that the difference between the secondary signal strength value and the primary signal strength value is below the predetermined threshold (at block 522), the method 500 may proceed to block 526, wherein the method 500 may include determining if a predetermined period of time has expired. As discussed above, the predetermined period of time utilized by the polling signal module 202 may be an amount of time that is deemed to be appropriate for the portable device(s) 126 to be remaining stationary within the one or more of the local zones 132a-132f in order for the hand free door ASIC 108 to safely actuate powered opening of one or more vehicle doors 104a-104e determined to be located in closest proximity to the portable device(s) 126. As discussed above, the polling signal module 202 may execute the timer that is utilized to determine if the predetermined period of time has expired to determine if the portable device(s) 126 remains stationary for the predetermined period of time.

As discussed, the method 500 provides additional detail with respect to the blocks 402-406 of the method 400 of FIG. 4. Accordingly, blocks 510-526 discussed above provide additional details as to determining that the portable device 126 is stationary for the predetermined period of time within the at least one local area zone of the vehicle 102, as determined at block 404 of the method 400. Referring to method 400 of FIG. 4, upon determining that the portable device 126 is stationary for the predetermined period of time within the at least one local area polling zone 132a-132f of the vehicle 102 (at block 404), the method 400 may proceed to block 406, wherein the method 400 may include supplying an amount of power to the motor 106a-106e associated with the at least one vehicle door 104a-104e to open or close the at least one vehicle door 104a-104e.

In an exemplary embodiment, upon determining that the position of the portable device(s) 126 is stationary for the predetermined period of time (at block 404), the polling signal module 202 may communicate with the door actuation module 204 to determine if the vehicle door(s) 104a-104e that is located in close proximity to the location of the portable device(s) 126 is closed. If the polling signal module 202 determines that the respective vehicle door(s) 104a-104e is closed, the polling signal module 202 may send an actuation command to the door actuation module 204 to actuate powered opening of the vehicle door(s) 104a-104e that is located in close proximity to the location of the portable device(s) 126. In some embodiments, the polling signal module 202 may only send the actuation command to the door actuation module 204 upon determining that the location of the portable device(s) 126 is not within one of the door area zones 134a-134e that may include the space occupied by the respective vehicle door(s) 104a-104e as it is being opened to ensure that opening of the respective vehicle door(s) 104a-104e may not be physically obstructed by individual(s) that may be carrying the portable device(s) 126.

In one embodiment, upon receipt of the actuation command from the polling signal module 202, the door actuation module 204 may send one or more command signals to the power control unit 112 of the vehicle 102 to provide a first requisite amount of power to the respective motor(s) 106a-106e to start opening the vehicle door(s) 104a-104e that is located in close proximity to the location of the portable device(s) 126, based on the utilization of the signal strength thresholds, as discussed above.

In some embodiments, as the respective vehicle door(s) 104a-104e is in the process of being opened by the respective motor(s) 106a-106e, the motor(s) 106a-106e may provide a level of opening of the respective vehicle door(s) 104a-104e (e.g., an angle at which the tailgate door 104e is currently opened, a percentage of opening of the tailgate door 104e) to the door actuation module 204. As discussed below, in some embodiments, the door actuation module 204 may provide data signals that include the level of opening of the respective vehicle door(s) 104a-104e to the sensor control module 206.

In an illustrative example, once it is determined that the portable device(s) 126 is remaining stationary (e.g., the individual(s) carrying the portable device(s) 126 is standing still possibly waiting for the tailgate door 104e to be opened) for the predetermined period of time and that the portable device(s) 126 is not located within the door area zone 134e, the motor 106e is provided the first requisite amount of power to start opening the tailgate door 104e so that the tailgate door 104e that is configured as a lift gate door (similar to the configuration shown in FIG. 7B) starts to lift into an open position.

In one embodiment, if the polling signal module 202 determines that the position of the portable device(s) 126 is stationary for the predetermined period of time (at block 404), the polling signal module 202 may communicate with the door actuation module 204 to determine if the vehicle door(s) 104a-104e that is located in close proximity to the location of the portable device(s) 126 is open. If the polling signal module 202 determines that the respective vehicle door(s) 104a-104e is open, the polling signal module 202 may send one or more respective signals to the door actuation module 204 to actuate powered closing of the vehicle door(s) 104a-104e. More specifically, the polling signal module 202 may send a command signal(s) to the door actuation module 204 to actuate the powered closing of the respective vehicle door(s) 104a-104e.

In some embodiments, the polling signal module 202 may only send the actuation command to the door actuation module 204 upon determining that the location of the portable device(s) 126 is not within the respective door area zone(s) 134a-134e that includes the space occupied by the respective vehicle door(s) 104a-104e as it is being closed to ensure that closing of the respective vehicle door(s) 104a-104e may not be physically obstructed by the individual(s) that may be carrying the portable device(s) 126. In an exemplary embodiment, upon receiving the command signal(s) from the polling signal module 202, the door actuation module 204 may send one or more command signals to the power control unit 112 to provide a second requisite amount of power to the motor(s) 106a-106e to start powered closing of the respective vehicle door(s) 104a-104e.

In an illustrative example, once it is determined that the portable device(s) 126 is stationary (e.g., the individual(s) carrying the portable device(s) 126 is standing still possibly waiting for the tailgate door 104e to be opened) for the predetermined period of time and that the portable device(s) 126 is not located within the door area zone 134e that includes the space occupied by the tailgate door 104e when it may be closed, the motor 106e is provided the second requisite amount of power to start closing the tailgate door 104e so that the tailgate door 104e that is configured as a lift gate door (similar to the configuration shown in FIG. 6B) starts to drop into a closed position.

Figure 5C:
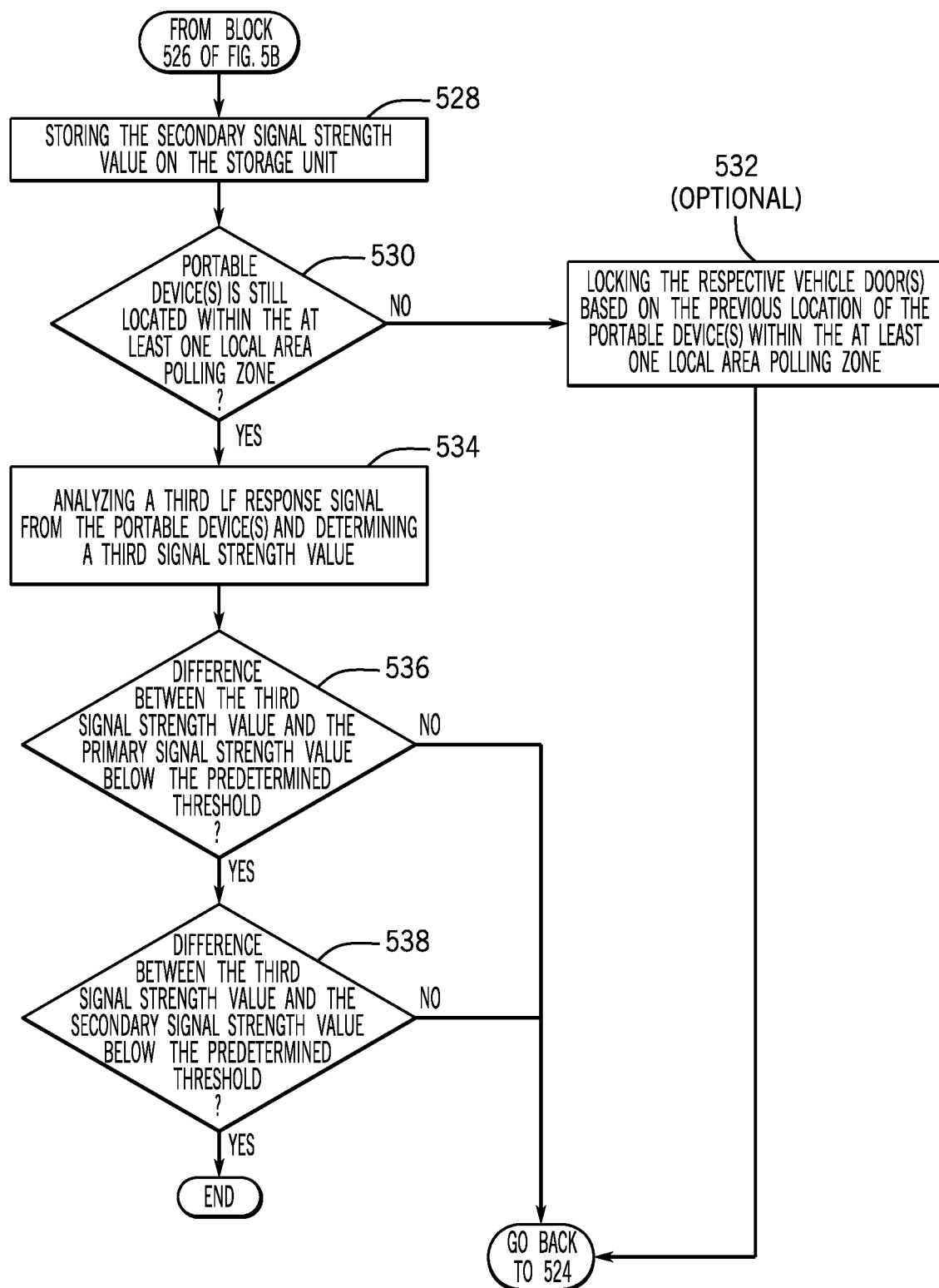
FIG. 5C is a process flow diagram of a third part of the method for providing hands free powered opening of the at least one vehicle door according to an exemplary embodiment of the present disclosure.

FIG. 5C is a process flow diagram of a third part of the method 500 for providing hands free powered opening of the at least one vehicle door 104a-104e according to an exemplary embodiment of the present disclosure. FIG. 5C will be described with reference to the components of FIG. 1 and FIG. 2 though it is to be appreciated that the method of FIG. 5C may be used with other systems and/or components. If it is determined that the predetermined period of time has not expired (at block 526 of FIG. 5B), the method 500 may proceed to block 528, wherein the method 500 may include storing the secondary signal strength value on the storage unit 116. This scenario may occur when the portable device(s) 126 is determined to be remaining stationary (at block 522) but the predetermined period of time has not yet expired in order to actuate powered opening of the respective vehicle door(s) 104a-104e (as determine at block 526). In an exemplary embodiment, the polling signal module 202 may access the storage unit 116 and store the secondary signal strength value (previously determined, as discussed with respect to block 520) on the storage unit 116. In some embodiments, the secondary signal strength value may be accessible to the polling signal module 202 until the portable device(s) 126 is determined to no longer be located within the respective local area polling zone(s) 132a-132f or the vehicle door(s) 104a-104e is opened.

The method 500 may proceed to block 530, wherein the method 500 may include determining if the portable device(s) 126 is still located within the at least one local area polling zone 132a-132f. In one embodiment, the polling signal module 202 may send a command signal(s) to the communication control unit 114 to reinitiate transmission of one or more high power LF polling signals by the transceiver(s) 118a-118h (as discussed in detail above with respect to block 516). If the portable device(s) 126 is still located within the respective local area polling zone(s) 132a-132f, upon receiving the one or more high power LF polling signals, the transceiver 138 of the portable device(s) 126 may send a LF polling response signal to the transceiver(s) 118a-118h.

Upon receipt of the LF polling response signal by the transceiver(s) 118a-118h that are near to the local area polling zone(s) 132a-132e in which the portable device(s) 126 is determined to be located, data from the received LF polling response signal may be communicated to the polling signal module 202 by the communication control unit 114. The polling signal module 202 may determine that the portable device(s) 126 is still located within at least one local area polling zone(s) 132a-132e in which it was previously determined to be located (as discussed at block 508) based on the receipt of the data from the received LF polling response signal. Conversely, if the portable device(s) 126 is no longer located within the respective local area polling zone(s) 132a-132f, the polling signal module 202 will not receive the data from the received LF polling response signal and may therefore determine that the portable device(s) 126 is no longer located within the local area polling zone(s) 132a-132f.

If it is determined that the portable device(s) 126 is no longer located within the at least one local area polling zone (at block 530), the method 500 may proceed to optional block 532, wherein the method 500 may include locking the respective vehicle door(s) 104a-104e based on the previous location of the portable device(s) 126 within the at least one local area polling zone 132a-132f. In one or more embodiments, upon determining that the portable device(s) 126 is no longer located within the local area polling zone(s) 132a-132f as previously determined to be located (as discussed with respect to block 508), the polling signal module 202 may send a signal(s) to the door actuation module 204 to lock the respective vehicle door(s) 104a-104e that was previously unlocked (as discussed with respect to optional block 518).

In one embodiment, upon receipt of the signal(s), the door actuation module 204 may determine the vehicle door(s) 104a-104e that was previously unlocked that are in closest proximity to the local area polling zone(s) 132a-132f in which the portable device(s) 126 was determined to be located (as discussed with respect to block 508). The door actuation module 204 may send a signal(s) to the power control unit 112 to supply a predetermined amount of power to the motor(s) 106a-106e associated with the vehicle door(s) 104a-104e to lock the lock(s) 122a-122e of the respective vehicle door(s) 104a-104e.

In an illustrative example, if the portable device(s) 126 is no longer determined to be located within the local area polling zone 132a, as was previously determined to be located, the door actuation module 204 may send the command signal(s) to lock the lock 122a of the left side front door 104a. The method 500 may then revert back to block 524 (shown in FIG. 5B), wherein the method 500 may include estimating that the portable device(s) 126 is not stationary for a predetermined period of time.

If it is determined that the portable device(s) 126 is still located within the at least one local area polling zone (at block 530), the method 500 may proceed to block 534, wherein the method 500 may include analyzing a third LF polling response signal from the portable device(s) 126 and determining a third signal strength value. As discussed above, upon receipt of the LF polling response signal by the transceiver(s) 118a-118h that are near to the local area polling zone(s) 132a-132e in which the portable device(s) 126 is determined to be located, data from the received LF polling response signal may be communicated to the polling signal module 202 by the communication control unit 114. Upon receiving the data pertaining to the LF polling response signal, the polling signal module 202 may identify the LF polling response signal as a third LF polling response signal. In one embodiment, the polling signal module 202 may analyze the third LF polling response signal and may determine the signal strength of the third LF polling response signal. Upon determining the signal strength of the third LF polling response signal, the polling signal module 202 may determine a third signal strength value that is indicative of the signal strength of the third LF polling response signal.

With continued reference to the method 500, at block 536, the method 500 may include determining if a difference between the third signal strength and the primary signal strength value is below the predetermined threshold. In an exemplary embodiment, the polling signal module 202 may access the storage unit 116 to retrieve the primary signal strength value which was previously stored on the storage unit 116 by the polling signal module 202 (as discussed at block 514). The polling signal module 202 may compute a difference between the third signal strength value and the primary signal strength value and output a primary/third difference value.

It is to be appreciated that in circumstances in which the polling signal module 202 determines that the portable device(s) 126 is located within more than one of the local area polling zones 132a-132f (e.g., portable device 126 is located within and between the local area polling zone 132a and the local area polling zone 132b) the polling signal module 202 may access the storage unit 116 to retrieve the primary signal strength values associated with the transceivers 118a-118h that are in close proximity to the local area polling zones 132a-132f (e.g., the transceiver 118a is in close proximity to the local area polling zone 132a, and the transceiver 118b is in close proximity to the local area polling zone 132b) and may compute a difference between the third signal strength values and the primary signal strength values for each of the respective transceivers 118a-118h.

In an exemplary embodiment, upon computing the signal strength difference value(s) of the third and primary signal strength values, the polling signal module 202 may access the storage unit 116 to retrieve the one or more signal strength deviation threshold values that are associated with the transceiver(s) 118a-118h that are in close proximity to the local area polling zone(s) 132a-132e in which the portable device(s) 126 is determined to be located. As discussed above, in circumstances in which the polling signal module 202 determines that the portable device(s) 126 is located within more than one of the local area polling zones 132a-132f, the polling signal module 202 may access the storage unit 116 to retrieve the signal strength thresholds associated with the transceivers 118a-118h that are in closest proximity to the local area polling zones 132a-132f.

In one embodiment, upon retrieving the signal strength deviation threshold value(s), the polling signal module 202 may compare the primary/third difference value(s) to the signal strength deviation threshold value(s). If the polling signal module 202 determines that the primary/third differential value(s) is below the signal strength deviation threshold value(s), the polling signal module 202 may determine that the primary/third difference value(s) is within a predetermined stationary range.

As an illustrative example, the polling signal module 202 may determine the difference between the third signal strength value and the primary signal strength value and may output the primary/third difference value of 40h. The polling signal module 202 may compare the primary/third difference value of 40h against the signal strength deviation threshold value of 100h and may determine that the portable device(s) 126 is within the predetermined stationary range (−100h to 100h).

If it is determined that the difference between the third signal strength value and the primary signal strength value is not below the predetermined threshold (at block 536), the method 500 may revert to block 524, wherein the method 500 may include estimating that the portable device(s) 126 is not stationary within the at least one local area polling zone 132a-132f. In one embodiment, if the polling signal module 202 determines that the primary/third difference value is above the signal strength deviation threshold value(s), the polling signal module 202 may determine that the primary/third difference value is not within the predetermined stationary range. Therefore, the polling signal module 202 may determine that the portable device(s) 126 is not remaining stationary.

If it is determined that the difference between the third signal strength value and the primary signal strength value is below the predetermined threshold (at block 536), the method 500 may proceed to block 538, wherein the method 500 may include determining if a difference between the third signal strength value and the secondary signal strength value is below the predetermined threshold. In an exemplary embodiment, the polling signal module 202 may access the storage unit 116 to retrieve the secondary signal strength value which was previously stored on the storage unit 116 by the polling signal module 202 (as discussed at block 528). The polling signal module 202 may compute a difference between the third signal strength value and the secondary signal strength value and output a secondary/third difference value.

It is to be appreciated that in circumstances in which the polling signal module 202 determines that the portable device(s) 126 is located within more than one of the local area polling zones 132a-132f (e.g., portable device 126 is located within and between the local area polling zone 132a and the local area polling zone 132b) the polling signal module 202 may access the storage unit 116 to retrieve the secondary signal strength values associated with the transceivers 118a-118h that are in closest proximity to the local area polling zones 132a-132f (e.g., the transceiver 118a in close proximity to the local area polling zone 132a, and the transceiver 118b in close proximity to the local area polling zone 132b) and may compute a difference between the third signal strength values and the secondary signal strength values for each of the respective transceivers 118a-118h.

In an exemplary embodiment, upon computing the signal strength difference value of the third and secondary signal strength values, the polling signal module 202 may access the storage unit 116 to retrieve the one or more signal strength deviation threshold values that are associated with the transceiver(s) 118a-118h that are near to the local area polling zone(s) 132a-132e in which the portable device(s) 126 is determined to be located. As discussed above, in circumstances in which the polling signal module 202 determines that the portable device(s) 126 is located within more than one of the local area polling zones 132a-132f, the polling signal module 202 may access the storage unit 116 to retrieve the signal strength thresholds associated with the transceivers 118a-118h that are in closest proximity to the local area polling zones 132a-132f.

In one embodiment, upon retrieving the signal strength deviation threshold value(s), the polling signal module 202 may compare the secondary/third difference value(s) to the signal strength deviation threshold value(s). If the polling signal module 202 determines that the secondary/third differential value(s) is below the signal strength deviation threshold value(s), the polling signal module 202 may determine that the secondary/third difference value(s) is within a predetermined stationary range. Additionally, since the polling signal module 202 previously determined that the primary/third difference value is within the predetermined stationary range (as discussed at block 536), the polling signal module 202 may determine that the portable device(s) 126 are remaining in the stationary position within the respective local area polling zone(s) 132a-132f.

As an illustrative example, the polling signal module 202 may determine the difference between the third signal strength value and the secondary signal strength value and may output the secondary/third difference value of −40h. The polling signal module 202 may compare the secondary/third difference value of −40h against the signal strength deviation threshold value of 100h and may determine that the portable device(s) 126 is within the predetermined stationary range (−100h to 100h).

If it is determined that the difference between the third signal strength value and the secondary signal strength value is not below the predetermined threshold (at block 538), the method 500 may revert to block 524, wherein the method 500 may include estimating that the portable device(s) 126 is not stationary within the at least one local area polling zone 132a-132f. In one embodiment, if the polling signal module 202 determines that the secondary/third difference value is above the signal strength deviation threshold value(s), the polling signal module 202 may determine that the secondary/third difference value is not within the predetermined stationary range. Therefore, the polling signal module 202 may determine that the portable device(s) 126 is not remaining stationary. The method 500 may then revert back to back to block 502, wherein the method 500 may once again include transmitting a low power LF polling signal(s) to the portable device(s) 126, as discussed in detail above.

It is contemplated that the method 500 may continue by determining if the predetermined period of time has expired for the polling signal module 202 to continue to analyze one or more additional subsequent LF polling response signals (e.g., fourth, fifth, sixth, etc. number of signals) from the portable device(s) 126 in a similar manner as discussed above until the expiration of the predetermined period of time is determined. In such a scenario, the polling signal module 202 may operably communicate with a plurality of vehicle systems 208 to provide one or more notifications to the individual(s) holding the portable device(s) 126 to inform the individual(s) that if the portable device(s) 126 is in the stationary positon for the predetermined period of time and is not moved to enter the door area zones 134a-

134e, the vehicle door(s) 104a-104e may be opened or closed after the expiration of the predetermined period of time. It is also contemplated that the method 500 may end if the portable device(s) 126 is determined to be remaining stationary until the expiration of the predetermined period of time at which point the hand free door ASIC 108 may execute supplying the first amount of power to the motor 106a-106e associated with the at least one vehicle door 104a-104e to open the at least one vehicle door 104a-104e (as discussed above with respect to block 406 of the method 400).

It is to be appreciated that the process of method 500 may be utilized to open or close the vehicle door(s) 104a-104e. With respect to the closing of the vehicle door(s) 104a-104e, the polling signal module 202 of the hand free door ASIC 108 may analyze a number of LF polling signals against the signal strength thresholds to determine that the portable device(s) 126 is located outside of the one or more door area zones 134a-134e and the portable device(s) 126 remains stationary for a second predetermined period of time to actuate closing of the vehicle door(s) 104a-104e.

In one embodiment, if the polling signal module 202 determines the vehicle door(s) 104a-104e is open and that the portable device(s) 126 is remaining stationary for the second predetermined period of time within the local area polling zone(s) 132a-132f and outside of the door area zone(s) 134a-134e, the polling signal module 202 may send one or more respective signals to the door actuation module 204 to actuate powered closing and/or locking of the vehicle door(s) 104a-104e. The polling signal module 202 may send a command signal(s) to the door actuation module 204 to actuate the powered closing of the respective vehicle door(s) 104a-104e. In particular, the hand free door ASIC 108 may execute supplying the second amount of power to the motor 106a-106e associated with the at least one vehicle door 104a-104e to close the at least one vehicle door 104a-104e (as discussed above with respect to block 406 of the method 400).

Figure 6:
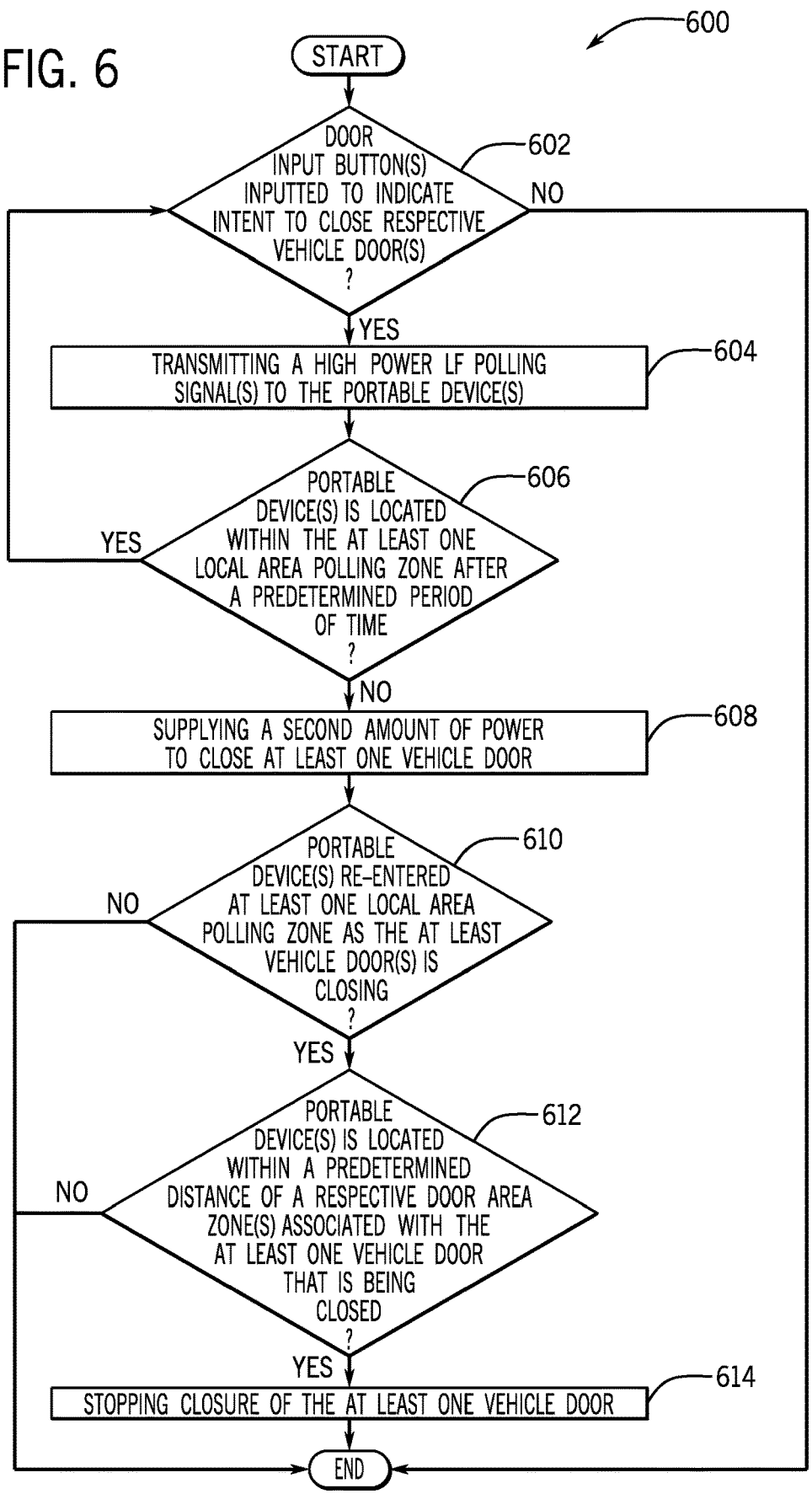
FIG. 6 is a process flow diagram of a method for providing hands free powered closing of the at least one vehicle door with LF polling according to an exemplary embodiment of the present disclosure.

FIG. 6 is a process flow diagram of a method 600 for providing hands free powered closing of the at least one vehicle door 104a-104e with LF polling according to an exemplary embodiment of the present disclosure. The method 600 includes an additional embodiment utilized by the hand free door ASIC 108 to actuate powered closing of the vehicle door(s) 104a-104e. FIG. 6 will be described with reference to the components of FIG. 1 and FIG. 2 though it is to be appreciated that the method of FIG. 6 may be used with other systems and/or components.

In an exemplary embodiment, the method 600 may start at block 602, wherein the method 600 may include determining if a door input button(s) 124a-124e has been inputted by an individual(s) to indicate an intent to close a respective vehicle door(s) 104a-104e. In one embodiment, upon input of one or more of the door input button(s) 124a-124e, a signal(s) may be sent from the respective door input button(s) 124a-124e to the door actuation module 204. The door actuation module 204 may communicate a respective signal(s) to the polling signal module 202. Based on the receipt of the signal(s), the polling signal module 202 may determine that the door input button(s) 124a-124e have been inputted to indicate the intent to close the respective vehicle door(s) 104a-104e that were previously opened.

If it is determined that the door input button(s) 124a-124e is inputted by the individual(s) to indicate the intent to close the respective vehicle door(s) 104a-104e (at block 602), the method 600 may proceed to block 604, wherein the method 600 may include transmitting a high power LF polling signal(s) to the portable device(s) 126. In one embodiment, the polling signal module 202 may send a command signal(s) to the communication control unit 114 to initiate transmission of one or more high power LF polling signals by the transceiver(s) 118a-118h. Upon receipt of the command signal(s), the communication control unit 114 may utilize the transceiver(s) 118a-118h to transmit the one or more high power LF polling signals that reaches the entirety of each of the local area polling zones 132a-132f. The communication control unit 114 may be configured to control the transceiver(s) 118a-118h to transmit a predetermined number of high power LF polling signals within a predetermined time period. In one embodiment, the communication control unit 114 may be configured to control the transceiver(s) 118a-118h to transmit the polling signals at a predetermined frequency (e.g., once per every 100 ms) to determine if the portable device(s) 126 is located within the local area polling zone(s) 132a-132f.

The method 600 may proceed to block 606, wherein the method 600 may include determining if the portable device(s) 126 is located within the at least one local area polling zone 132a-132f after a predetermined period of time. In one embodiment, the polling signal module 202 may continually transmit the high power LF polling signal(s) to the portable device(s) 126 for a second predetermined period of time. The second predetermined period of time may include a period of time that may be sufficient for the portable device(s) 126 to be moved away from the vicinity of the vehicle 102 that may be indicative of an intent to walk away from the vehicle 102 by the individual(s) carrying the portable device(s) 126. In other words, the predetermined period of time may include a period of time that is sufficient to indicate that the portable device(s) 126 may not be subsequently moved towards the vehicle door(s) 104a-104e after being moved away from the vehicle 102.

In one or more embodiments, the polling signal module 202 may send a command signal(s) to the communication control unit 114 to reinitiate transmission of one or more high power LF polling signals by the transceiver(s) 118a-118h. Upon receipt of the command signal(s), the communication control unit 114 may utilize the transceiver(s) 118a-118h to transmit the one or more high power LF polling signals that may reach the entirety of the local area polling zone(s) 132a-132f.

If the portable device(s) 126 is located within the local area polling zone(s) 132a-132f, upon receiving the one or more high power LF polling signals, the transceiver 138 of the portable device(s) 126 may send a LF polling response signal to the transceiver(s) 118a-118h. Upon receipt of the high power LF polling response signal(s) by the transceiver(s) 118a-118h that are in close proximity to the local area polling zone(s) 132a-132e, data from the received high power LF polling response signal may be communicated to the polling signal module 202 by the communication control unit 114. The polling signal module 202 may determine that the portable device(s) 126 is located within at least one local area polling zone(s) 132a-132e in which it was determined to be located based on the receipt of the data from the received LF polling response signal. Conversely, if the portable device(s) 126 is no longer located within the respective local area polling zone(s) 132a-132f, the polling signal module 202 will not receive the data from the received LF polling response signal. Consequently, the polling signal module 202 may determine that the portable device(s) 126 is no longer located within the local area polling zone(s) 132a-132f. Therefore, the polling signal module 202 may determine that the portable device(s) 126 is being moved away from the vehicle door(s) 104a-104e.

If it is determined that the portable device(s) 126 is not located within the local area polling zone after a predetermined period of time, the method 600 may proceed to block 608, wherein the method 600 may include supplying a second amount of power to close at least one vehicle door 104a-104e. In one embodiment, if the polling signal module 202 determines that the portable device(s) 126 is being moved away from the vehicle door(s) 104a-104e, the polling signal module 202 may send one or more respective signals to the door actuation module 204 to actuate powered closing and/or locking of the vehicle door(s) 104a-104e. More specifically, the polling signal module 202 may send a command signal(s) to the door actuation module 204 to actuate the powered closing of the respective vehicle door(s) 104a-104e. In an exemplary embodiment, upon receiving the command signal(s) from the polling signal module 202, the door actuation module 204 may send one or more command signals to the power control unit 112 to provide a second requisite amount of power to the motor(s) 106a-106e to start powered closing the respective vehicle door(s) 104a-104e. In one embodiment, upon the (full) closure of the respective vehicle door(s) 104a-104e, the door actuation module 204 may send a signal(s) to the lock(s) 122a-122e of the vehicle 102 to actuate locking of the respective lock(s) 122a-122e of the closed vehicle door(s) 104a-104e.

The method 600 may proceed to block 610, wherein the method 600 may determine if the portable device(s) 126 reenters the respective local area polling zone(s) 132a-132f as the at least one vehicle door(s) 104a-104e is closing. In one embodiment, as the respective vehicle door(s) 104a-104e is in the process of being closed by the motor(s) 106a-106e, the motor 106e may provide a level of closing of the tailgate door 104e (e.g., an angle at which the tailgate door 104e is currently closed) to the door actuation module 204 and the polling signal module 202. Upon evaluating the level of closing and determining that the vehicle door(s) 104a-104e has not yet closed, the polling signal module 202 may utilize the signal strength thresholds that pertain to the one or more LF polling response signals received by the transceiver(s) 118a-118h to determine the location of the portable device(s) 126. More specifically, the polling signal module 202 may utilize the local area threshold value(s) to determine if the portable device(s) 126 reenters the respective local area polling zone(s) 132a-132f in which the portable device(s) 126 was previously located (e.g., near to the vehicle door(s) 104a-104e that are being closed). If the polling signal module 202 determines that the portable device(s) 126 is again located within the local area polling zone(s) 132a-132f, the polling signal module 202 may send a corresponding signal(s) to the door actuation module 204 to indicate that the portable device(s) 126 re-enters the respective local area polling zone(s) 132a-132f in which it was previously located when the closing of the vehicle door(s) 104a-104e was actuated (at block 608).

If it is determined that the portable device(s) 126 re-enters at least one local area polling zone 132a-132f as the at least one vehicle door(s) 104a-104e is closing (at block 610), the method 600 may proceed to block 612, wherein the method 600 may include determining if the portable device(s) 126 is located within a predetermined distance of a respective door area zone(s) 134a-134e associated with the at least one vehicle door 104a-104e that is being closed. In one embodiment, upon determining that the portable device(s) 126 re-enters the respective local area polling zone(s) 132a-132f, the polling signal module 202 may further determine if the portable device(s) 126 is moved towards and is located (e.g., crosses) at a predetermined distance of the respective door area zone(s) 134a-134e that is associated (e.g., closest to) the respective vehicle door(s) 104a-104e. The polling signal module 202 may establish the predetermined distance to indicate areas within each of the local area polling zones 132a-132e that may be used to determine that the individual(s) carrying the portable device(s) 126 may be intending to return to the vehicle 102 and re-enter or reach into the vehicle 102 through the respective vehicle door(s) 104a-104e that is in the process of being closed.

In one or more embodiments, the polling signal module 202 may utilize the local area threshold value(s) to determine if the portable device(s) 126 is located at the predetermined distance of the respective door area zone 134a-134e based on the signal strength of the received LF polling response signals. In particular, the predetermined distance of the respective door area zones 134a-134e may be identified by signal strength values that are adjusted from the door area threshold values in order for the polling signal module 202 to determine if the portable device(s) 126 is located at the predetermined distance. More specifically, upon receiving the LF polling response signal(s) from the portable device(s) 126, the polling signal module 202 may evaluate the signal strength(s) of the received signal(s) and may further compare the signal strength(s) to the door area threshold values. If the polling signal module 202 determines that the signal strength(s) are higher than the respective door area threshold values, the polling signal module 202 may further determine if the signal strength(s) are equivalent to the signal strength values that are adjusted from the door area threshold values in order for the polling signal module 202 to determine if the portable device(s) 126 is located at the predetermined distance.

If it is determined that the portable device(s) 126 is located within a predetermined distance of a respective door area zone(s) 134a-134e associated with the at least one vehicle door 104 that is being closed (at block 612), the method 600 may proceed to block 614, wherein the method 600 may include stopping closure of the at least one vehicle door 104a-104e. In one embodiment, upon determining that the portable device(s) 126 is located within the predetermined distance of the respective door area zone(s) 134a-134e, the polling signal module 202 may send a command signal(s) to the door actuation module 204 to cease the powered closing of the respective vehicle door(s) 104a-104e. In an exemplary embodiment, upon receiving the command signal(s) from the polling signal module 202, the door actuation module 204 may send one or more command signals to the power control unit 112 to stop providing the second requisite amount of power to the motor(s) 106a-106e to stop the powered closing of the respective vehicle door(s) 104a-104e.

In one or more embodiments, the polling signal module 202 may additionally send an actuation command to the door actuation module 204 to actuate powered opening of the vehicle door(s) 104a-104e that is located in close proximity to the location of the portable device(s) 126. In some embodiments, the polling signal module 202 may only send the actuation command to the door actuation module 204 upon determining that the location of the portable device(s) 126 is not within one of the door area zones 134a-134e that may include the space occupied by the respective vehicle door(s) 104a-104e as it is being opened to ensure that opening of the respective vehicle door(s) 104a-104e may not be physically obstructed by individual(s).

As an illustrative example, the door actuation module 204 sends one or more command signals to the power control unit 112 to provide a second requisite amount of power to the motor(s) 106e to start closing the tailgate door 104e (at block 608) upon determining that the portable device(s) 126 is not located within the local area polling zone 132e in which it was previously located when the individual(s) carrying the portable device(s) 126 was previously placing objects within the within the rear portion 128c (e.g., trunk) of the vehicle 102. As the tailgate door 104e is closing, the polling signal module 202 may determine that the portable device(s) 126 is moved to re-enter the local area polling zone 132e (at block 610) and may further determine that the portable device (s) 126 is located within the predetermined distance of the door area zone 134e (at block 612) as the portable device(s) 126 is moved back towards the tailgate door 104e as it is being closed.

These determinations may be utilized by the hand free door ASIC 108 to stop the closure of the tailgate door 104e (at block 614) to ensure that it does not fully close as the portable device(s) 126 is being moved back towards the tailgate door 104e (e.g., as the individual(s) holding the portable device(s) 126 re-approaches the tailgate door 104e). Additionally, if the polling signal module 202 determines that the portable device(s) 126 has not been moved back into the door area zone 134e, the polling signal module 202 may actuate the powered re-opening of the tailgate door 104e from a stopped semi-closed state. This functionality ensures that the tailgate door 104e does not close and may reopen to allow the individual(s) to place/remove object(s) within/ from the rear portion 128c (e.g., trunk) of the vehicle 102.

Figure 7A:
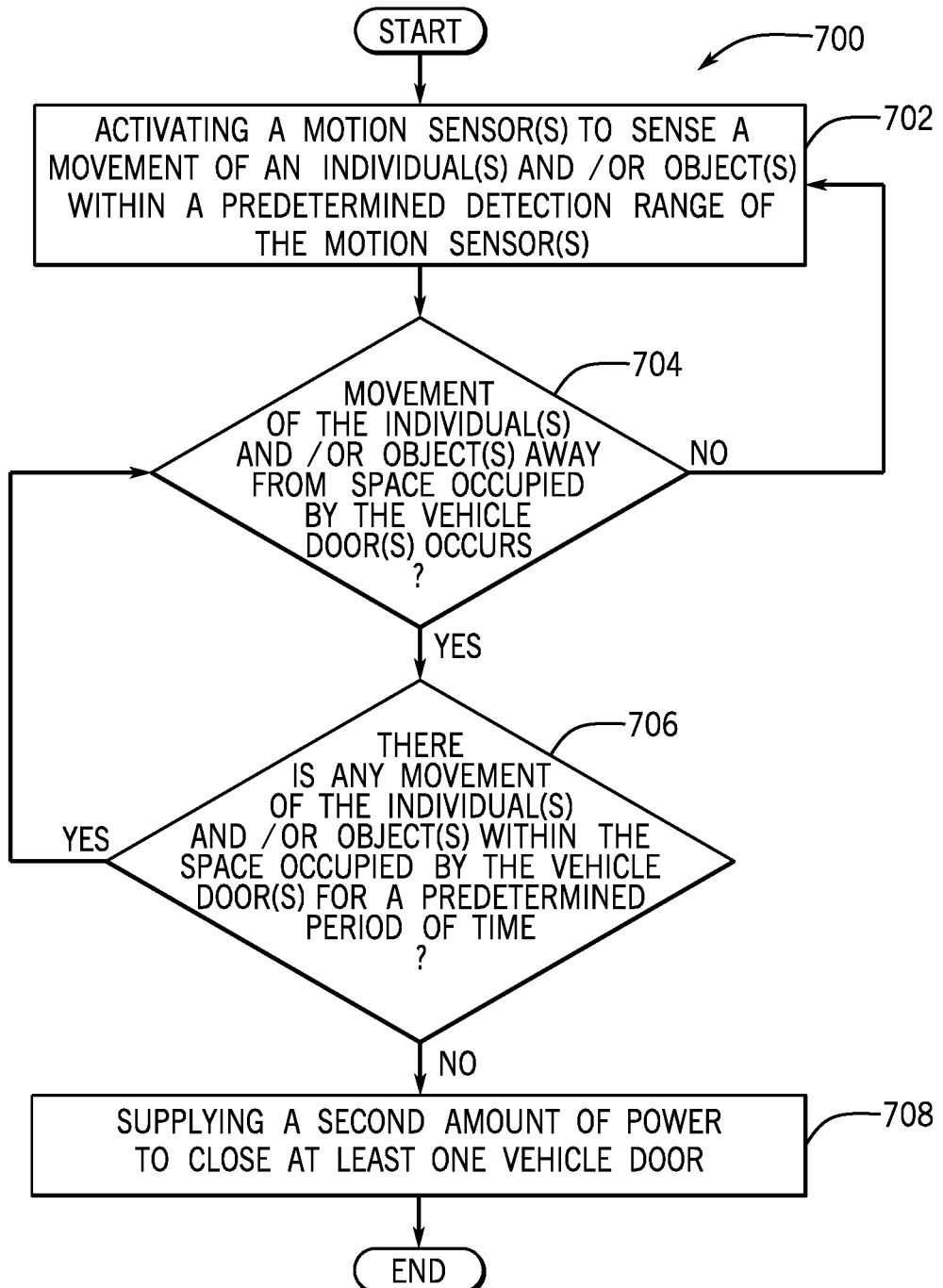
FIG. 7A is a process flow diagram of a method for providing hands free powered closing of the at least one vehicle door with motion sensing, according to an exemplary embodiment of the present disclosure.

FIG. 7A is a process flow diagram of a method 700 for providing hands free powered closing of the at least one vehicle door 104a-104e with motion sensing according to an exemplary embodiment of the present disclosure. FIG. 7A will be described with reference to the components of FIG. 1 and FIG. 2 though it is to be appreciated that the method 700 of FIG. 7A may be used with other systems and/or components. It is to be appreciated that one or more aspects of the method 700 may be utilized within the method 600 (of FIG. 6), discussed above to provide hands free powered closing of the at least one vehicle door 104a-104e with LF polling and motion sensing.

The method 700 may start at block 702, wherein the method 700 may include activating a motion sensor(s) 120a-120e to sense the movement of an individual(s) and/or object(s) within a predetermined detection range of the motion sensor 120e. In an exemplary embodiment, upon sending the one or more command signals to the power control unit 112 of the vehicle 102 to provide the first requisite amount of power to the motor(s) 106a-106e to start opening one or more of the vehicle doors 104a-104e (as discussed above with respect to block 406 of method 400), the door actuation module 204 may send an indication signal(s) to the sensor control module 206. The indication signal(s) may be sent to indicate to the sensor control module 206 that the respective vehicle door(s) 104a-104e is in the process of being opened. In one embodiment, upon receiving the indication signal(s) from the door actuation module 204, the sensor control module 206 may send the activation signal(s) to the motion sensor(s) 120a-120e to activate the motion sensor(s) 120a-120e to sense the movement of the individual(s) and/or the object(s) (placed by the individual(s)) within the predetermined detection range of the motion sensor 120e.

In another embodiment, upon receiving the aforementioned indication signal(s) from the door actuation module 204, the sensor control module 206 may await an input of the door input button(s) 124a-124e that may be inputted by the individual(s) to indicate that the individual(s) intends for the respective vehicle door(s) 104a-104e to be closed before sending the activation signal(s) to the motion sensor 120e. Upon receiving an input of the door input button(s) 124a-124e, a respective signal(s) may be sent by the door actuation module 204 to the sensor control module 206 to indicate the individual's intent for the respective vehicle door(s) 104a-104e to be closed. Upon receipt of the input signal(s), the sensor control module 206 may send the activation signal(s) to the motion sensor(s) 120a-120e to activate the motion sensor(s) 120a-120e to sense the movement of the individual(s) and/or the object(s) within the predetermined detection range of vehicle door(s) 104a-104e.

FIG. 7B is an illustration of a motion sensor utilizing a predetermined detection range of the tailgate door according to an exemplary embodiment of the present disclosure. For the purposes of simplicity, the predetermined detection range will now be described with respect to the tailgate door 104e and associated components. However, it is to be appreciated that this disclosure applies to any of the vehicle door(s) 104a-104e and the corresponding components of and/or associated to the one or more of the vehicle doors 104a-104e.

In an exemplary embodiment, the motion sensor 120e may operate to determine if the individual(s) (e.g., individual(s) carrying the portable device(s) 126) is within the predetermined detection range of the tailgate door 104e. The predetermined detection range may be a static or dynamic sensing range of the motion sensor 120e that includes the space depicted by the portion labeled as 'S' in FIG. 7B that is occupied by the tailgate door 104e as its being opened. The portion 'S' may also include the space occupied by the tailgate door 104e as it is being closed. As described below, the motion sensor 120e may operate to determine if the individual(s) and/or object(s) are moving within the predetermined detection range and a pattern of movement of the individual(s) and/or object(s) within the predetermined detection range.

In an exemplary embodiment, the predetermined detection range of the tailgate door 104e may be adjusted to include a modifiable amount of space that is located within the vicinity of the tailgate door 104e. As discussed above, as the vehicle door(s) 104a-104e is in the process of being opened by the motor(s) 106a-106e, the motor(s) 106a-106e may provide the level of opening of the tailgate door 104e to the door actuation module 204. In one embodiment, the door actuation module 204 may provide data signal(s) that include the level of opening of the tailgate door 104e to the sensor control module 206. Upon receiving the data signal(s) that include the level of opening of the tailgate door 104e, the sensor control module 206 may calibrate the motion sensor 120e to adjust the predetermined detection range of the tailgate door 104e to account for the changing space S occupied by the tailgate door 104e as its being opened.

As depicted by rays labeled as R1-R8 within FIG. 7B, as the tailgate door 104e is in the process of being opened by the motor 106e, the sensor control module 206 may calibrate the motion sensor 120e to modify the predetermined detection range (R1-R8) in which the motion of the individual(s) and/or object(s) is detected. This functionality allows the motion of the individual(s) and/or the object(s) to be properly detected as the individual(s) may move and/or may move the object(s) based on the change in the space S as the tailgate door 104e fully opens.

In an alternate embodiment, upon receiving the aforementioned data signal(s) that include the level of opening of the tailgate door 104*e*, the sensor control module 206 may only calibrate the motion sensor 120*e* upon determining that the opening of the tailgate door 104*e* has been stopped while opening. For example, the individual(s) carrying the portable device(s) 126 may input the door open/close start/stop button of the input buttons 140 on the portable device(s) 126 to stop the opening of the tailgate door 104*e* in order to place or pickup an additional object from the vehicle 102. Upon determining the stopping of the opening of the tailgate door 104*e*, the sensor control module 206 may calibrate the motion sensor 120*e* to adjust the predetermined detection range based on the stopped open position of the tailgate door 104*e* (e.g., the position of the tailgate door as it came to a rest upon its opening being stopped).

With reference to FIG. 7A and FIG. 7B, upon activation of the motion sensor to sense the movement of the individual(s) and/or object(s) within the predetermined detection range of the motion sensor 120*e* (at block 702), at block 704, the method 700 may include determining if movement of the individual(s) and/or object(s) away from the space occupied by the vehicle door(s) 104*a*-104*e* occurs. In an exemplary embodiment, upon activation of the motion sensor 120*e*, the motion sensor 120*e* may sense if the individual(s) and/or object(s) placed by the individual(s) are moving away from the vehicle 102 and outside of the space occupied by the vehicle door(s) 104*a*-104*e* (which may include the door area zones 134*a*-134*e* that are utilized by the polling signal module 202).

In one embodiment, the motion sensor 120*e* may be configured to determine the pattern of motion based on sensing movements of the individual(s) and/or object(s) as sensed within the predetermined detection range of the motion sensor 120*e*. If the motion sensor 120*e* determines that pattern of motion of the individual(s) and/or object(s) is moving away from the space occupied by the vehicle door(s) 104*a*-104*e*, the motion sensor 120*e* may send a motion sensing signal(s) to the sensor control module 206 to provide indication to the sensor control module 206 that the individual(s) and/or the object(s) are being moved outside of the space occupied by the vehicle door(s) 104*a*-104*e*. For example, the motion sensor 120*e* may sense when the individual(s) move away from the tailgate door 104*e* and outside of the space S and/or move object(s) outside from the space S, such that it is safe to possibly close the tailgate door 104*e* without physically impacting the individual(s) and/or the object(s).

In an illustrative example, once the tailgate door 104*e* has been opened by the motor 106*e*, the individual may approach the vehicle 102 and place objects within the rear portion 128*c* (e.g., trunk) of the vehicle 102. When the individual places the objects within the rear portion 128*c* of the vehicle 102, the individual may be standing within the space S and/or may place some of the objects within the space S as they are loading them within the rear portion 128*c*. Upon loading the objects within the rear portion 128*c*, the individual may walk away from the space S. The motion pattern of the individual walking away from the space S as the individual is moving towards the outside of the detection range of the motion sensor 120*e* may be sensed by the motion sensor 120*e*.

If it is determined that the movement of the individual(s) and/or object(s) away from the space occupied by the vehicle door(s) 104*a*-104*e* does not occur (at block 704), the method 700 may revert back to block 702 wherein activation of the motion sensor(s) 120*a*-120*e* to sense movement of the individual(s) and/or object(s) within the predetermined detection range of the motion sensor(s) 120*a*-120*e* occurs.

If it is determined that movement of the individual(s) and/or object(s) away from the space occupied by the vehicle door(s) 104*a*-104*e* occurs (at block 704), at block 706, the method 700 may include determining if there is any movement of the individual(s) and/or object(s) within the space occupied by the vehicle door(s) 104*a*-104*e* for a predetermined period of time. The predetermined period of time may be a period of time that is sufficient to indicate that the individual(s) and/or object(s) may not subsequently move towards and within the space occupied by the vehicle door(s) 104*a*-104*e* after moving away from the space (as determined at block 704). With reference to the illustrative example discussed above, the predetermined period of time may be an amount of time such as 12 seconds that may provide a buffer to ensure that after moving away and out of the space S, the individual may not move back towards and into the space S to load more objects within the rear portion 128*c* of the vehicle 102.

In one embodiment, the polling signal module 202 may utilize the signal strength thresholds that pertain to the one or more LF polling response signals received by the transceiver(s) 118*a*-118*h* to determine the location of the portable device(s) 126. More specifically, the polling signal module 202 may utilize the local area threshold value(s) to determine if the portable device(s) 126 is not located within the local area polling zone(s) 132*a*-132*f* that it was previously located in, when the vehicle door(s) 104*a*-104*e* was opened for the predetermined period of time, as discussed above. If the polling signal module 202 determines that the portable device(s) 126 is not located within the local area polling zone(s) 132*a*-132*f*, the polling signal module 202 may send a corresponding signal(s) to the sensor control module 206 to indicate that there is no movement detected within the space occupied by the vehicle door(s) 104*a*-104*e* for the predetermined period of time and that it may be safe to close the respective vehicle door(s) 104*a*-104*e* of the vehicle 102.

In an alternate embodiment, the sensor control module 206 may communicate with the motion sensor(s) 120*a*-120*e* for a predetermined period of time to ensure that there is no movement sensed by the motion sensor(s) 120*a*-120*e* that occurs within the space occupied by the vehicle door(s) 104*a*-104*e* for the predetermined period of time. More specifically, the motion sensor(s) 120*a*-120*e* may sense if any motion occurs within the predetermined detection range to determine if motion of an individual(s) and/or object(s) occur within the space occupied by the vehicle door(s) 104*a*-104*e* for the predetermined period of time. If the motion sensor 120*e* does not sense any motion within the predetermined detection range for the predetermined period of time, the motion sensor 120*e* may send a corresponding signal(s) to the sensor control module 206 that indicates that there is no movement detected within the predetermined period of time and that it may be safe to close the respective vehicle door(s) 104*a*-104*e*.

If it is determined that there is no movement of the individual(s) and/or object(s) within the space occupied by the vehicle door(s) for the predetermined period of time (at block 706), the method 700 may proceed to block 708, wherein the method 700 may include supplying a second amount of power to close at least one vehicle door 104*a*-104*e*. In an exemplary embodiment, upon receiving the corresponding signal(s) from the polling signal module 202 and/or the sensor control module 206, the door actuation module 204 may send one or more command signals to the power control unit 112 to provide a second requisite amount of power to the motor(s) 106*a*-106*e* to start closing the respective vehicle door(s) 104*a*-104*e*. With reference again to FIG. 7B, in an illustrative example, once it is determined that the portable device(s) 126 is not located within the space S occupied by the tailgate door 104*e* as its being opened, the motor 106*e* is provided the requisite amount of power to start closing the tailgate door 104*e* so that the tailgate door 104*e* that is configured as the lift gate door (similar to the configuration shown in FIG. 7B) starts to drop into a closed position.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It can be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art.

The invention claimed is:

1. A computer-implemented method for providing hands free operation of at least one vehicle door comprising:
   receiving at least one polling response signal that is sent by a portable device in response to the portable device receiving at least one polling signal sent from a vehicle;
   analyzing the at least one polling response signal received by the vehicle to determine a signal strength of the at least one polling response signal;
   determining if the portable device is located within at least one local area polling zone of the vehicle based on a comparison of the signal strength of the at least one polling response signal to at least one local area threshold value that is specifically associated with at least one transceiver of the vehicle that receives the at least one polling response signal with a highest signal strength; and
   determining if the portable device is stationary for a predetermined period of time within the at least one local area polling zone of the vehicle, wherein at least one difference value between the signal strength of the at least one polling response signal received from the portable device and a signal strength of at least one subsequent polling response signal received from the portable device is computed to determine if the portable device is stationary for the predetermined amount of time, wherein the at least one difference value is compared to at least one signal strength deviation threshold that is associated with at least one transceiver of the vehicle that is in proximity to the at least one local area polling zone of the vehicle in which the portable device is located, wherein an amount of power is supplied to a motor associated with the at least one vehicle door to open or close the at least one vehicle door if it is determined that the portable device is stationary for the predetermined period of time within the at least one local area polling zone of the vehicle.

2. The computer-implemented method of claim 1, wherein determining if the portable device is located within at least one local area polling zone of the vehicle includes determining that the portable device is located within at least one local area polling zone when the signal strength of the at least one polling response signal is equal to or above the at least one local area threshold value that is specifically associated with the at least one transceiver of the vehicle that receives the at least one polling response signal with the highest signal strength.

3. The computer-implemented method of claim 1, wherein determining if the portable device is located within at least one local area polling zone of the vehicle includes determining that the portable device is located within at least one local area polling zone that is in proximity to the at least one transceiver that receives the at least one polling response signal with the highest signal strength.

4. The computer-implemented method of claim 3, further including determining that the portable device is located within at least one door area zone of the vehicle when the signal strength of at least one polling response signal is equal to or above at least one door area threshold value.

5. The computer-implemented method of claim 4, wherein the portable device is determined to be located within the at least one local area polling zone of the vehicle when the signal strength of the at least one polling response signal is below the at least one door area threshold value and equal to or above the at least one local area threshold value that is specifically associated with the at least one transceiver of the vehicle that receives the at least one polling response signal with the highest signal strength.

6. The computer-implemented method of claim 1, further including determining that the portable device is located within a wide area polling zone when the signal strength of the at least one polling response signal is below the at least one local area threshold value that is specifically associated with the at least one transceiver of the vehicle that receives the at least one polling response signal with the highest signal strength.

7. The computer-implemented method of claim 1, wherein determining if the portable device is stationary for the predetermined period of time includes comparing the at least one difference value to the at least one signal strength deviation threshold that is associated with the at least one transceiver of the vehicle that is in proximity to the at least one local area polling zone of the vehicle in which the portable device is located to determine if the at least one difference value is within a predetermined stationary range.

8. A system for providing hands free operation of at least one vehicle door comprising:
   a memory storing instructions when executed by a processor cause the processor to:
   receive at least one polling response signal that is sent by a portable device in response to the portable device receiving at least one polling signal sent from a vehicle;
   analyze the at least one polling response signal received by the vehicle to determine a signal strength of the at least one polling response signal;
   determine if the portable device is located within at least one local area polling zone of the vehicle based on a comparison of the signal strength of the at least one polling response signal to at least one local area threshold value that is specifically associated with at least one transceiver of the vehicle that receives the at least one polling response signal with a highest signal strength; and determine if the portable device is stationary for a predetermined period of time within the at least one local area polling zone of the vehicle, wherein at least one difference value between the signal strength of the at least one polling response signal received from the portable device and a signal strength of at least one subsequent polling response signal received from the portable device is computed to determine if the portable device is stationary for the predetermined amount of time, wherein the at least one difference value is compared to at least one signal strength deviation threshold that is associated with at least one transceiver of the vehicle that is in proximity to the at least one local area polling zone of the vehicle in which the portable device is located, wherein an amount of power is supplied to a motor associated with the at least one vehicle door to open or close the at least one vehicle door if it is determined that the portable device is stationary for the predetermined period of time within the at least one local area polling zone of the vehicle.

9. The system of claim 8, wherein determining if the portable device is located within at least one local area polling zone of the vehicle includes determining that the portable device is located within at least one local area polling zone when the signal strength of the at least one polling response signal is equal to or above the at least one local area threshold value that is specifically associated with the at least one transceiver of the vehicle that receives the at least one polling response signal with the highest signal strength.

10. The system of claim 8, wherein determining if the portable device is located within at least one local area polling zone of the vehicle includes determining that the portable device is located within at least one local area polling zone that is in proximity to the at least one transceiver that receives the at least one polling response signal with the highest signal strength.

11. The system of claim 10, further including determining that the portable device is located within at least one door area zone of the vehicle when the signal strength of at least one polling response signal is equal to or above at least one door area threshold value.

12. The system of claim 11, wherein the portable device is determined to be located within the at least one local area polling zone of the vehicle when the signal strength of the at least one polling response signal is below the at least one door area threshold value and equal to or above the at least one local area threshold value that is specifically associated with the at least one transceiver of the vehicle that receives the at least one polling response signal with the highest signal strength.

13. The system of claim 8, further including determining that the portable device is located within a wide area polling zone when the signal strength of the at least one polling response signal is below the at least one local area threshold value that is specifically associated with the at least one transceiver of the vehicle that receives the at least one polling response signal with the highest signal strength.

14. The system of claim 8, wherein determining if the portable device is stationary for the predetermined period of time includes comparing the at least one difference value to the at least one signal strength deviation threshold that is associated with the at least one transceiver of the vehicle that is in proximity to the at least one local area polling zone of the vehicle in which the portable device is located to determine if the at least one difference value is within a predetermined stationary range.

15. A non-transitory computer readable storage medium storing instructions that, when executed by a computer, which includes at least a processor, causes the computer to perform a method, the method comprising:

receiving at least one polling response signal that is sent by a portable device in response to the portable device receiving at least one polling signal sent from a vehicle;

analyzing the at least one polling response signal received by the vehicle to determine a signal strength of the at least one polling response signal;

determining if the portable device is located within at least one local area polling zone of the vehicle based on a comparison of the signal strength of the at least one polling response signal to at least one local area threshold value that is specifically associated with at least one transceiver of the vehicle that receives the at least one polling response signal with a highest signal strength; and determining if the portable device is stationary for a predetermined period of time within the at least one local area polling zone of the vehicle, wherein at least one difference value between the signal strength of the at least one polling response signal received from the portable device and a signal strength of at least one subsequent polling response signal received from the portable device is computed to determine if the portable device is stationary for the predetermined amount of time, wherein the at least one difference value is compared to at least one signal strength deviation threshold that is associated with at least one transceiver of the vehicle that is in proximity to the at least one local area polling zone of the vehicle in which the portable device is located, wherein an amount of power is supplied to a motor associated with at least one vehicle door to open or close the at least one vehicle door if it is determined that the portable device is stationary for the predetermined period of time within the at least one local area polling zone of the vehicle.

16. The non-transitory computer readable storage medium of claim 15, further including determining that the portable device is located within a wide area polling zone when the signal strength of the at least one polling response signal is below the at least one local area threshold value that is specifically associated with the at least one transceiver of the vehicle that receives the at least one polling response signal with the highest signal strength.

* * * * *